US012615662B2

(12) United States Patent
Kubo et al.

(10) Patent No.: US 12,615,662 B2
(45) Date of Patent: Apr. 28, 2026

(54) MAIN BODY DEVICE, METHOD OF CONTROLLING MAIN BODY DEVICE, OPERATION DEVICE, METHOD OF CONTROLLING OPERATION DEVICE, AND RECORDING MEDIUM

(71) Applicant: Panasonic Intellectual Property Management Co., Ltd., Osaka (JP)

(72) Inventors: Takeshi Kubo, Osaka (JP); Yuji Ohta, Osaka (JP); Tomohiko Taniguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 724 days.

(21) Appl. No.: 17/927,281

(22) PCT Filed: Aug. 17, 2020

(86) PCT No.: PCT/JP2020/031037
§ 371 (c)(1),
(2) Date: Nov. 22, 2022

(87) PCT Pub. No.: WO2021/245955
PCT Pub. Date: Dec. 9, 2021

(65) Prior Publication Data
US 2023/0206747 A1 Jun. 29, 2023

(30) Foreign Application Priority Data
Jun. 5, 2020 (JP) ................................. 2020-098679

(51) Int. Cl.
*H04W 74/06* (2009.01)
(52) U.S. Cl.
CPC ................................... *H04W 74/06* (2013.01)

(58) Field of Classification Search
CPC ..... H04W 74/06; H04W 76/14; H04W 76/30; H04W 4/80; H04W 48/16; H04W 84/10; H04W 84/18
(Continued)

(56) References Cited

U.S. PATENT DOCUMENTS

| | | |
|---|---|---|
| 2010/0014005 A1 | 1/2010 | Yano et al. |
| 2010/0273419 A1 | 10/2010 | Rajagopal et al. |

(Continued)

FOREIGN PATENT DOCUMENTS

| | | |
|---|---|---|
| JP | 07-147697 A | 6/1995 |
| JP | 2008-219818 A | 9/2008 |

(Continued)

OTHER PUBLICATIONS

Extended European Search Report issued in corresponding EP Application No. 20938664.8, dated Nov. 16, 2023.
(Continued)

*Primary Examiner* — Eugene Yun
(74) *Attorney, Agent, or Firm* — Rimon P.C.

(57) ABSTRACT

A main body device includes a first communicator (an RF communicator) for transmitting and receiving a signal in a first communication scheme, a second communicator (an IR communicator) for receiving a signal in a second communication scheme, and a controller that executes a process in accordance with an operation signal transmitted from an operation device and received via the first communicator or the second communicator. The controller, by communicating with a communication device via the first communicator, determines whether the controller can determine the timing of transmitting or receiving a signal to or from the communication device via the first communicator. If the controller determines that the controller cannot determine such a timing, the controller executes a switching process that
(Continued)

400
100
200
300 causes the operation device to transmit an operation signal in the second communication scheme.

6 Claims, 22 Drawing Sheets

(58) Field of Classification Search
USPC ........................................................ 455/41.2
See application file for complete search history.

(56) References Cited

U.S. PATENT DOCUMENTS

| | | |
|---|---|---|
| 2018/0359729 A1 | 12/2018 | Okumura |
| 2019/0052794 A1 | 2/2019 | Kikuchi |
| 2019/0327406 A1 | 10/2019 | Tokunaga |
| 2020/0228664 A1* | 7/2020 | Tomidokoro .......... G03B 17/02 |

FOREIGN PATENT DOCUMENTS

| | | |
|---|---|---|
| JP | 2017-118236 A | 6/2017 |
| JP | 2019-161433 A | 9/2019 |
| JP | 2019-193020 A | 10/2019 |
| JP | 2020-057899 A | 4/2020 |
| WO | 2012/117452 A1 | 9/2012 |

OTHER PUBLICATIONS

International Search Report dated Sep. 15, 2020 issued in International Patent Application No. PCT/JP2020/031037, with English translation.

* cited by examiner

FIG. 3

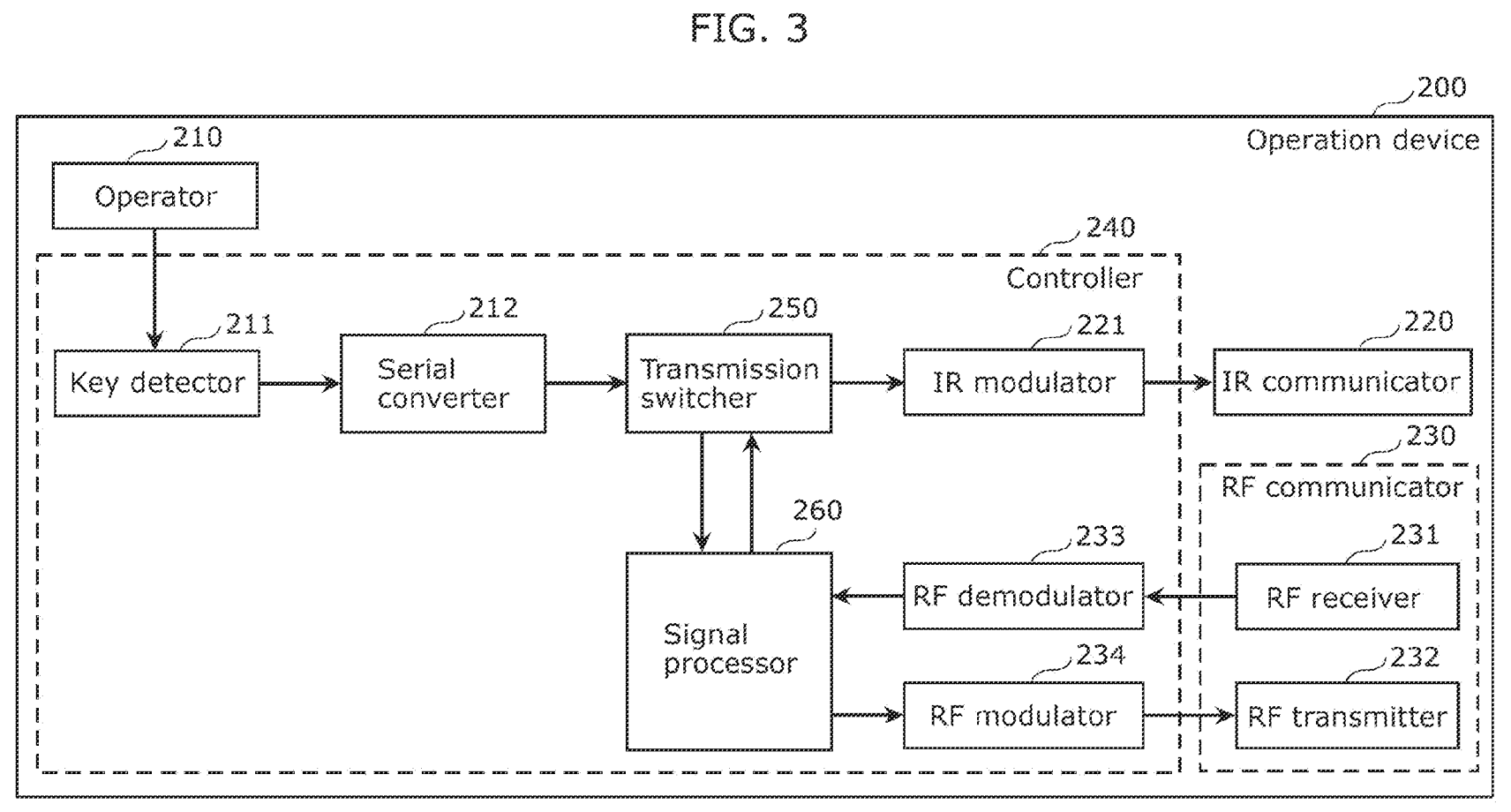

Operation device 200

Operator 210

Controller 240

Key detector 211

Serial converter 212

Transmission switcher 250

Signal processor 260

IR modulator 221

RF demodulator 233

RF modulator 234

IR communicator 220

RF communicator 230

RF receiver 231

RF transmitter 232

Figure 8:
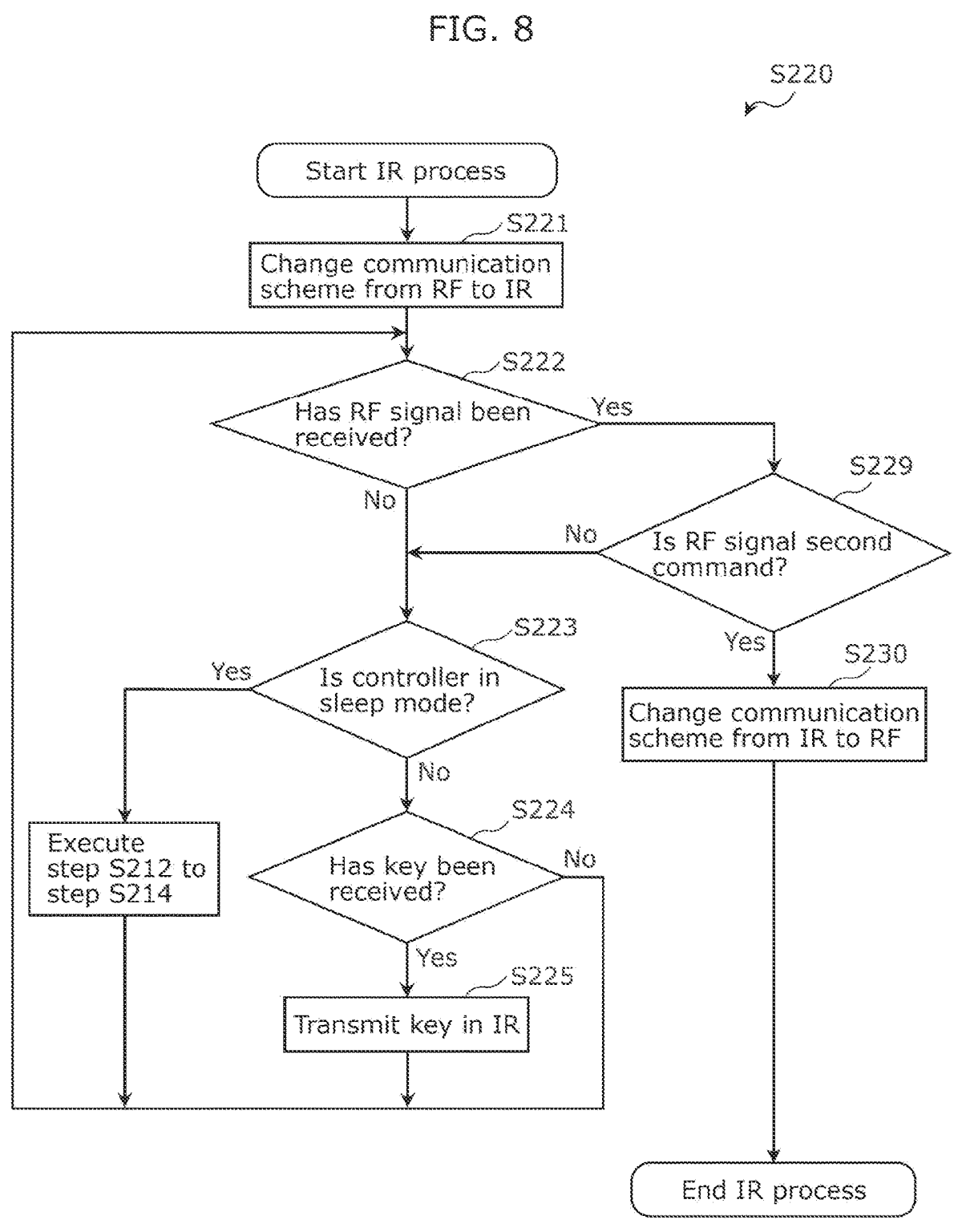

Start IR process

S221
Change communication scheme from RF to IR

S222
Has RF signal been received? — Yes → S229

No

S229
Is RF signal second command? — No →

Yes

S230
Change communication scheme from IR to RF

S223
Is controller in sleep mode? — Yes →

No

Execute step S212 to step S214

S224
Has key been received? — No →

Yes

S225
Transmit key in IR

End IR process

Figure 15:
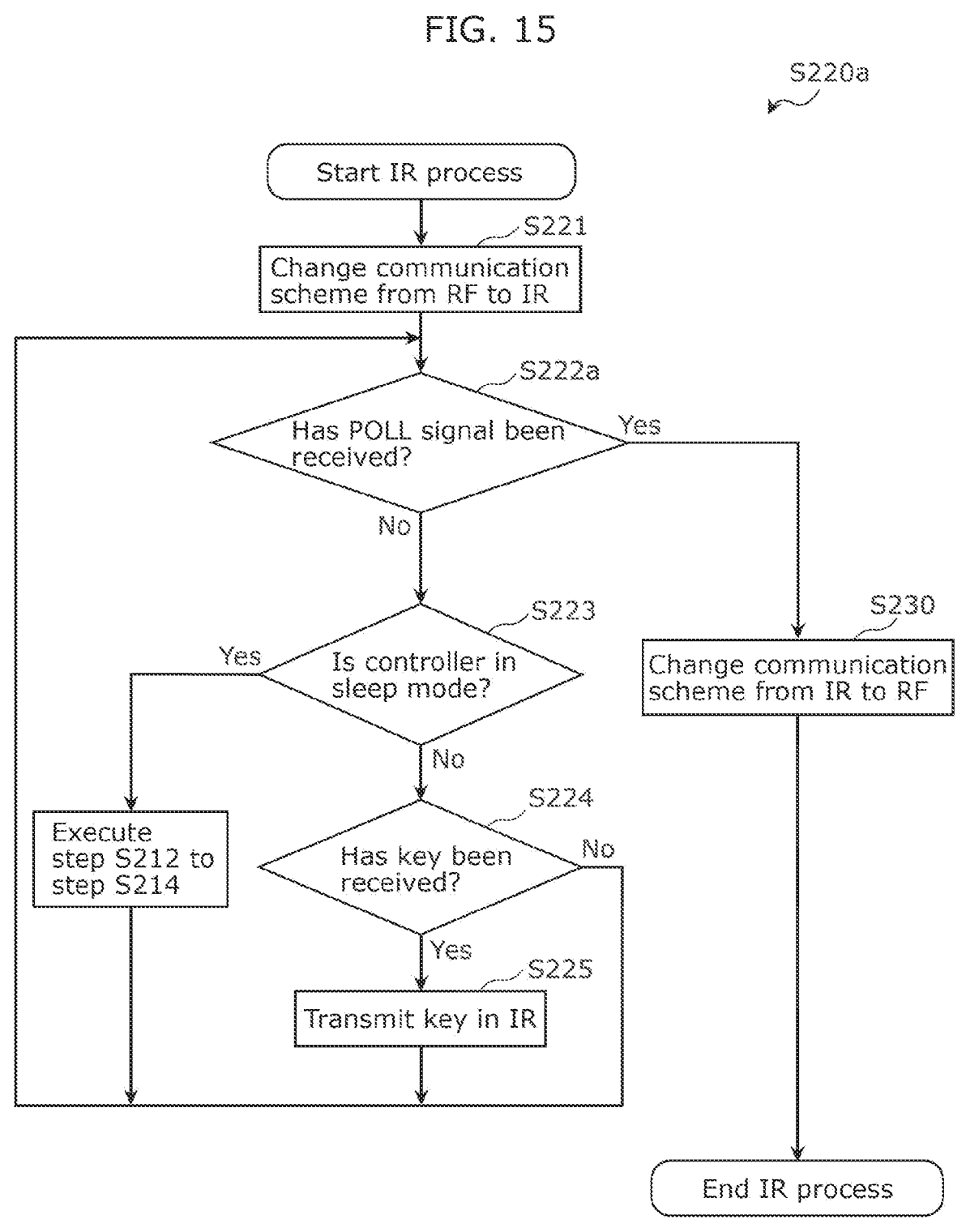

Start IR process

↓ S221

Change communication scheme from RF to IR

↓

S222a

Has POLL signal been received? —— Yes ——→

No ↓

S223

Is controller in sleep mode? —— Yes ——→

No ↓

S224

Has key been received? —— No ——

Yes ↓ S225

Transmit key in IR

Execute step S212 to step S214

S230

Change communication scheme from IR to RF

↓

End IR process

FIG. 18

MAIN BODY DEVICE, METHOD OF CONTROLLING MAIN BODY DEVICE, OPERATION DEVICE, METHOD OF CONTROLLING OPERATION DEVICE, AND RECORDING MEDIUM

CROSS-REFERENCE OF RELATED APPLICATIONS

This application is the U.S. National Phase under 35 U.S.C. § 371 of International Patent Application No. PCT/JP2020/031037, filed on Aug. 17, 2020, which in turn claims the benefit of Japanese Patent Application No. 2020-098679, filed on Jun. 5, 2020, the entire disclosures of which Applications are incorporated by reference herein.

TECHNICAL FIELD

The present disclosure relates to a main body device, a method of controlling a main body device, an operation device, a method of controlling an operation device, and a recording medium.

BACKGROUND ART

Patent Literature (PTL) 1 discloses an information processing system that includes a video camera and an operation device. The operation device serves as a remote controller that controls the video camera. The video camera and the operation device communicate with each other while selectively adopting Wi-Fi (registered trademark) communication or Bluetooth (registered trademark) communication. When an operator of the operation device remains unoperated for a preset duration or longer, the video camera and the operation device halt Wi-Fi (registered trademark) communication and communicate with each other only via Bluetooth (registered trademark) communication. In this manner, as the communication scheme is changed as appropriate in the video camera and the operation device, the power consumed by the video camera and the operation device can be reduced.

CITATION LIST

Patent Literature

[PTL 1]
Japanese Unexamined Patent Application Publication No. 2017-118236

SUMMARY OF INVENTION

Technical Problem

The present disclosure provides a main body device and so on capable of suppressing a data collision that could occur when the main body device and so on communicate wirelessly with another device.

Solution to Problem

A main body device according to the present disclosure is a main body device that communicates wirelessly with an operation device and a communication device. The operation device is capable of transmitting and receiving a signal in a first communication scheme and capable of transmitting a signal in a second communication scheme different from the first communication scheme. The communication device is capable of transmitting and receiving a signal in the first communication scheme. The main body device includes: a first communicator for transmitting and receiving a signal in the first communication scheme; a second communicator for receiving a signal in the second communication scheme; and a controller that executes a process in accordance with an operation signal transmitted from the operation device and received via the first communicator or the second communicator, wherein the controller: determines, by communicating with the communication device via the first communicator, whether the controller can determine a timing of transmitting or receiving a signal to or from the communication device via the first communicator; and in response to determining that the controller cannot determine the timing, executes a switching process that causes the operation device to transmit the operation signal in the second communication scheme.

A method of controlling a main body device according to the present disclosure is a method of controlling a main body device that communicates wirelessly with an operation device and a communication device. The operation device is capable of transmitting and receiving a signal in a first communication scheme and capable of transmitting a signal in a second communication scheme different from the first communication scheme. The communication device is capable of transmitting and receiving a signal in the first communication scheme. The main body device includes a first communicator for transmitting and receiving a signal in the first communication scheme, and a second communicator for receiving a signal in the second communication scheme. The method of controlling the main body device includes: determining, by communicating with the communication device via the first communicator, whether it is possible to determine a timing of transmitting or receiving a signal to or from the communication device via the first communicator; in response to determining that it is not possible to determine the timing, executing a switching process that causes the operation device to transmit an operation signal in the second communication scheme; and executing a process in accordance with the operation signal received via the second communicator.

An operation device according to the present disclosure is an operation device for operating a main body device by transmitting, to the main body device, an operation signal in a first communication scheme or a second communication scheme. The operation device includes: a first communicator for transmitting and receiving a signal in the first communication scheme; a second communicator for receiving a signal in the second communication scheme; and a controller that transmits the operation signal to the main body device via the first communicator or the second communicator, wherein the controller transmits the operation signal in the second communication scheme, in response to determining that the main body device has executed a switching process that causes the operation device to transmit the operation signal in the second communication scheme; and transmits the operation signal in the first communication scheme, in response to determining that the main body device has not executed the switching process.

A method of controlling an operation device according to the present disclosure is a method of controlling an operation device that is for operating a main body device by transmitting, to the main body device, an operation signal in a first communication scheme or a second communication scheme. The operation device includes a first communicator for transmitting and receiving a signal in the first communication scheme, and a second communicator for receiving a signal in the second communication scheme. The method of controlling the operation device includes: transmitting the operation signal in the second communication scheme, in response to determining that the main body device has executed a switching process that causes the operation device to transmit the operation signal in the second communication scheme; and transmitting the operation signal in the first communication scheme, in response to determining that the main body device has not executed the switching process.

One aspect of a recording medium according to the present disclosure is a non-transitory computer readable recording medium having recorded thereon a program that causes a computer to execute the method of controlling the main body device according to the present disclosure.

Another aspect of a recording medium according to the present disclosure is a non-transitory computer readable recording medium having recorded thereon a program that causes a computer to execute the method of controlling the operation device according to the present disclosure.

Advantageous Effects of Invention

The main body device and so on according to the present disclosure can suppress a data collision that could occur when the main body device and so on communicate wirelessly with another device.

BRIEF DESCRIPTION OF DRAWINGS

FIG. 3 is a block diagram illustrating a configuration of an operation device according to Embodiment 1.

FIG. 8 is a flowchart illustrating an IR process that the operation device according to Embodiment 1 executes.

FIG. 12 is a block diagram illustrating a configuration of an operation device according to Embodiment 2.

FIG. 15 is a flowchart illustrating an IR process that the operation device according to Embodiment 2 executes.

FIG. 18 is a block diagram illustrating a configuration of an operation device according to Embodiment 3.

Figure 1:
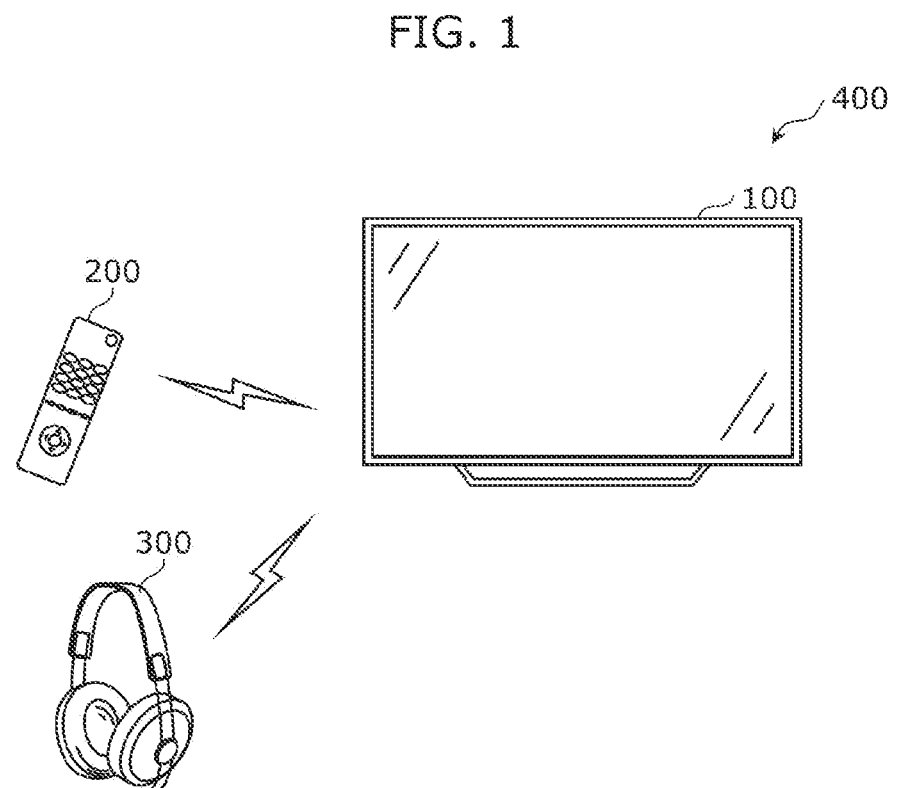
FIG. 1 is a schematic diagram illustrating a configuration of a communication system according to Embodiment 1.

DESCRIPTION OF EMBODIMENTS (Underlying Knowledge Forming Basis of the Present Disclosure)

First, the focus of the inventors will be described below.

Conventionally, there exist television sets and operation devices that communicate wirelessly with each other. Such television sets and operation devices capable of wireless communication adopt standardized wireless communication schemes, such as Bluetooth (registered trademark). Meanwhile, there conventionally exist television sets that are capable not only of communicating wirelessly with a single device, such as an operation device (also referred to as a remote controller), but also of wirelessly and simultaneously communicating with a plurality of devices, such as a headphone enabled for wireless communication. A user, for example, operates an operation device to operate a television set—for example, the user turns on or off the television set or switches the programs. Alternatively, the user, for example, can adjust the TV volume, that is, the headphone volume by operating the operation device while listening to the sound from the television set with the headphone.

The Bluetooth (registered trademark) standard defines roles in a primary-secondary relationship between a plurality of devices so as to allow the plurality of devices to communicate wirelessly therebetween. Specifically, a primary device (also referred to as a master) and a secondary device (also referred to as a slave) are defined between communicating devices.

With such definition, even in a case where a plurality of devices communicate wirelessly therebetween, a collision of communication data (a data collision) can be prevented.

The term "master" as used herein refers to, of wirelessly communicating devices, a device that determines the timing at which each device transmits data. Meanwhile, the term "slave" as used herein refers to, of the wirelessly communicating devices, a device whose timing of transmitting data is determined by a master.

In a case where a television set communicates wirelessly with a plurality of devices simultaneously, for example, the television set communicates with the plurality of devices to set the television set as a master and the plurality of devices as slaves. Thus, the television set and the plurality of devices are each set as being primary or secondary.

With this configuration, the television set, having been set as a master, controls the timing at which the television set and the plurality of devices set as slaves transmit or receive data to or from each other, and thus no data collision occurs even when the television set communicates wirelessly with the plurality of devices.

The primary-secondary relationship setting described above may be preconfigured in some devices. For example, there may be a device that is preconfigured to always become a master when the device carries out wireless communication. When such a device communicates wirelessly with a television set, the television set fails to be set as a master and is instead set as a slave.

In such a case, for example, between a television set and a first device, the first device may be set as a slave and the television set may be set as a master, whereas between the television set and a second device different from the first device, the second device may be set as a master and the television set may be set as a slave. In this case, the second device carries out wireless communication at a timing that the second device sets out, without checking the timings when the television set and the first device carry out wireless communication therebetween. Then, if, for example, signals are transmitted simultaneously from the plurality of devices to the television set, the television set fails to receive some or the entirety of the signals transmitted from the plurality of devices. This phenomenon is called a data collision. For example, when the second device carries out wireless communication at the timing that the second device sets out, without checking the timings at which the television set and the first device carry out wireless communication therebetween, a data collision may occur in the television set.

In light of the above circumstances, the inventors have come to the present disclosure.

Hereinafter, some embodiments will be described in detail with reference to the drawings as appropriate. Herein, however, any description that is more elaborate than necessary may be omitted. For example, features that are already well known may not be described in detail, or duplicate description of substantially identical configurations may be omitted. This is for keeping the following description from becoming more lengthy than necessary and for facilitating an understanding of a person skilled in the art.

It is to be noted that the inventors provide the appended drawings and the following description merely to help a person skilled in the art understand the present disclosure at a sufficient level, and these drawings and description are not intended to limit the subject matter set forth in the claims.

Embodiment 1

Hereinafter, Embodiment 1 will be described with reference to FIG. 1 to FIG. 10. According to Embodiment 1, an operation device establishes wireless communication with a main body device, and if, after that, the operation device receives an RF signal that includes a switch signal (a first command) from the main body device, the operation device switches the communication scheme that the operation device uses to communicate with the main body device. In this case, the main body device and the operation device maintain their state of being in communication (a communicating state). In this example, the main body device and the operation device enter a disconnected state when the operation device enters a sleep mode. Meanwhile, if the main body device receives an RF signal that includes a connection request (a connection command) from the operation device after the main body device and the operation device have entered the disconnected state from the communicating state, the main body device and the operation device return to the communicating state.

[1-1. Configuration]
<Communication System>

FIG. 1 is a schematic diagram illustrating a configuration of communication system 400 that includes main body device 100 and operation device 200 according to Embodiment 1.

As illustrated in FIG. 1, communication system 400 includes main body device 100, operation device 200, and communication device 300. Operation device 200 transmits a signal to main body device 100 to allow a user to operate main body device 100. Communication device 300 is capable of communicating wirelessly with main body device 100.

Main body device 100 is a device that communicates wirelessly with operation device 200 and communication device 300. Operation device 200 is capable of transmitting and receiving a signal in a first communication scheme and is also capable of transmitting a signal in a second communication scheme different from the first communication scheme. Communication device 300 is capable of transmitting and receiving a signal in the first communication scheme. Some non-limiting examples of main body device 100 include a Blu-ray (BD) (registered trademark) disc player, a recorder, a game console, or a personal computer. According to the present embodiment, main body device 100 is a television set. Main body device 100 receives a video stream (also referred to as airwaves) of a program or the like broadcast from, for example but not limited to, a base station (not illustrated), and main body device 100 outputs video and audio accordingly.

Main body device 100 is connected to and is capable of communicating wirelessly with operation device 200 and communication device 300.

In this example, the number of communication devices 300 connected to and capable of communicating wirelessly with main body device 100 may be one or more, and there is no particular limitation on the number of such communication devices 300. In the examples described below, communication system 400 includes one communication device 300.

Operation device 200 is a remote controller that the user can use to operate main body device 100. Specifically, operation device 200 is a device that transmits, to main body device 100, an operation signal (also referred to below as a key) in the first communication scheme or the second communication scheme, and thus operation device 200 allows the user to operate main body device 100. The user operates operation device 200 to cause operation device 200 to transmit a desired command (a signal). Thus, the user causes main body device 100 to change the video (the program) to be output from main body device 100 or causes main body device 100 to adjust the volume of the audio being output from main body device 100. In other words, the user operates main body device 100 by operating operation device 200.

Operation device 200 communicates wirelessly with main body device 100 in two communication schemes. Specifically, operation device 200 is capable of transmitting a signal to main body device 100 in the first communication scheme or in the second communication scheme different from the first communication scheme.

The first communication scheme and the second communication scheme differ from each other, for example but not limited to, in the standard or the frequencies these schemes use. For example, the first communication scheme and the second communication scheme differ from each other in their communication speed. According to the present embodiment, the first communication scheme is a communication scheme that is based on Bluetooth (registered trademark), and the second communication scheme is a communication scheme in which infrared (IR) light is used. In other words, according to the present embodiment, operation device 200 is capable of transmitting a signal (an IR signal) to main body device 100 with use of IR light and is also capable of transmitting and receiving a signal (a radio frequency (RF) signal) to and from main body device 100 through radio wave (RF signal) wireless communication that is based on the Bluetooth (registered trademark) standard. Meanwhile, main body device 100 is capable of receiving an IR signal and is also capable of transmitting and receiving an RF signal.

In this example, it suffices that the wireless communication schemes between main body device 100 and operation device 200 be such that the first wireless communication scheme and the second wireless communication scheme differ from each other, and there is no particular limitation on either the first wireless communication scheme or the second wireless communication scheme. A communication scheme that can be used in wireless communication between main body device 100 and operation device 200 is, for example, compliant with any of the following predetermined wireless communication standards: IR light (frequency: 33 kHz to 40 kHz); Bluetooth (registered trademark) (frequency: 2402 MHz to 2480 MHz); wireless local area network (LAN) (frequency: 2412 MHz to 2484 MHz, 5180 MHz to 5700 MHz); Wi-Fi (registered trademark); ZigBee (registered trademark) (frequency: 2.4 GHz band, 868 MHz band, 915 MHz band); or Digital Enhanced Cordless Telecommunications (DECT) (frequency: 1880 MHz to 1900 MHz, 1920 MHz to 1930 MHz).

Communication device 300 is a device that communicates wirelessly with main body device 100. Some non-limiting examples of communication device 300 include a personal computer, a monitor, a smartphone, or a headphone. According to the present embodiment, communication device 300 is a headphone. By communicating wirelessly with main body device 100, communication device 300 obtains audio information (an audio packet) output by main body device 100 and outputs audio based on the obtained audio information. Specifically, communication device 300 communicates wirelessly with main body device 100 via an RF signal with use of the same communication scheme that operation device 200 uses. For example, in a case where operation device 200 communicates wirelessly with main body device 100 in accordance with the Bluetooth (registered trademark) standard, communication device 300 communicates wirelessly with main body device 100 also in accordance with the Bluetooth (registered trademark) standard. In another example, in a case where operation device 200 communicates wirelessly with main body device 100 in accordance with the Wi-Fi (registered trademark) standard, communication device 300 communicates wirelessly with main body device 100 also in accordance with the Wi-Fi (registered trademark) standard. According to the present embodiment, communication device 300 communicates wirelessly with main body device 100 in accordance with the Bluetooth (registered trademark) standard.

<Main Body Device>

Figure 2:
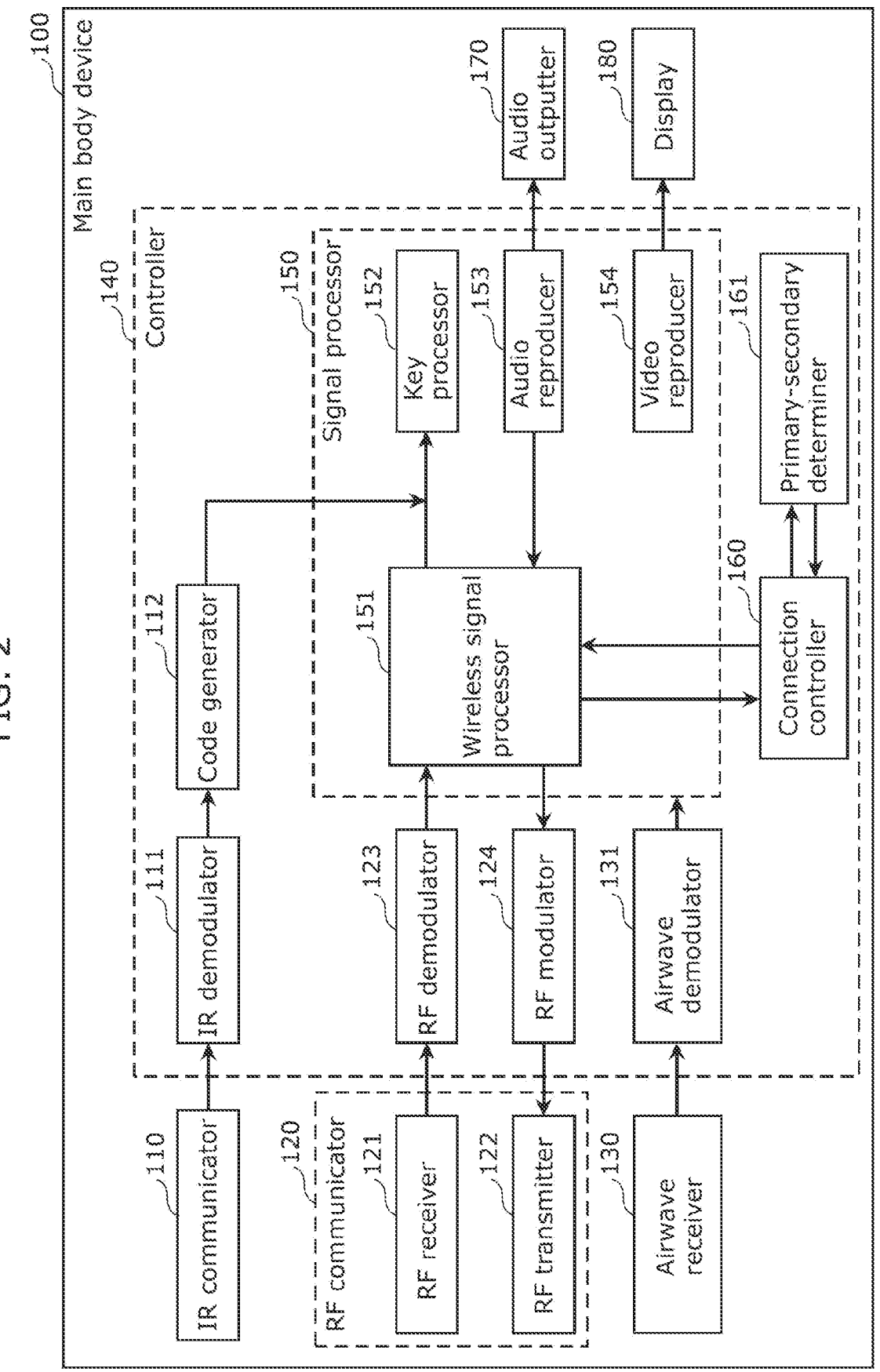
FIG. 2 is a block diagram illustrating a configuration of a main body device according to Embodiment 1.

FIG. 2 is a block diagram illustrating a configuration of main body device 100 according to Embodiment 1.

Main body device 100 includes IR communicator 110, RF communicator 120, airwave receiver 130, controller 140, audio outputter 170, and display 180.

RF communicator 120 is an example of a first communicator that main body device 100 includes.

IR communicator 110 is an example of a second communicator that main body device 100 includes.

IR communicator 110 is a communication interface for receiving a signal in the second communication scheme. Specifically, IR communicator 110 is a photosensor for receiving IR light transmitted from operation device 200. In other words, IR communicator 110 receives an IR signal represented by IR light transmitted from operation device 200.

RF communicator 120 is a communication interface for transmitting and receiving a signal in the first communication scheme. Specifically, RF communicator 120 is a communication interface for transmitting and receiving an RF signal. RF communicator 120 includes RF receiver 121 and RF transmitter 122.

RF receiver 121 is a communication interface, such as an antenna, for receiving an RF signal transmitted from operation device 200 and an RF signal transmitted from communication device 300. In other words, RF receiver 121 receives an RF signal transmitted from operation device 200 and an RF signal transmitted from communication device 300.

RF transmitter 122 is a communication interface, such as an antenna, for transmitting an RF signal modulated by RF modulator 124 (described later) to operation device 200 and to communication device 300.

Airwave receiver 130 is a communication interface, such as an antenna, for receiving a signal (a broadcast signal) that includes a video stream of a program or the like broadcast from, for example, a base station (not illustrated).

Controller 140 is a processor that executes various processes. For example, controller 140 executes a process in accordance with an operation signal transmitted from operation device 200 and received via IR communicator 110 or RF communicator 120.

Controller 140 is implemented, for example, by a central processing unit (CPU) and a control program stored in a memory (not illustrated) of main body device 100, such as a read only memory (ROM), a random access memory (RAM), a hard disk drive (HDD), or a solid state drive (SSD). Such a memory, for example, stores various items of information concerning main body device 100, such as a media access control (MAC) address of main body device 100. Such a memory also stores, for example, various items of information to be used in wireless communication carried out via an RF signal, and examples of such information include a MAC address of a device paired to main body device 100 (pairing will be described later).

Controller 140 communicates with communication device 300 via a first communicator to determine whether controller 140 can determine the timing of transmitting or receiving a signal to or from communication device 300 via the first communicator. If controller 140 determines that controller 140 cannot determine such a timing, controller 140 executes a switching process that causes operation device 200 to change the communication scheme that operation device 200 uses from the wireless communication in the first communication scheme to the wireless communication in the second communication scheme. According to the present embodiment, controller 140 communicates with communication device 300 via RF communicator 120 to determine whether controller 140 can determine the timing of transmitting or receiving a signal to or from communication device 300 via RF communicator 120. If controller 140 determines that controller 140 cannot determine such a timing, controller 140 executes the switching process that causes operation device 200 to transmit an operation signal in the communication scheme in which IR light is used. In other words, when controller 140 is not a master but a slave to communication device 300, controller 140 executes a process (a switching process) to cause operation device 200 to transmit an operation signal in the communication scheme in which IR light is used.

Meanwhile, for example, if controller 140 determines that controller 140 can determine the timing described above, controller 140 executes a switching process to cause operation device 200 to transmit an operation signal in Bluetooth (registered trademark). In other words, when controller 140 is not a slave but a master to communication device 300, controller 140 executes a process (a switching process) to cause operation device 200 to transmit an operation signal in Bluetooth (registered trademark).

According to the present embodiment, in the switching process described above, controller 140 causes operation device 200 to transmit an operation signal in the communication scheme in which IR light is used, by transmitting, to operation device 200 via RF communicator 120, a switch signal (a first command (described later), according to the present embodiment) that causes operation device 200 to transmit an operation signal in the communication scheme in which IR light is used.

Meanwhile, after controller 140 has executed pairing to operation device 200, controller 140 repeatedly transmits, to operation device 200, a POLL signal (a polling signal) for synchronizing with operation device 200, and thus controller 140 maintains the state of being in communication with operation device 200. In this example, in the switching process described above according to the present embodiment, controller 140 repeatedly transmits a POLL signal to operation device 200 even after having transmitted a switch signal.

Details of pairing will be described later.

Controller 140 includes, function-wise, IR demodulator 111, code generator 112, RF demodulator 123, RF modulator 124, airwave demodulator 131, signal processor 150, connection controller 160, and primary-secondary determiner 161. Respective processes executed by IR demodulator 111, code generator 112, RF demodulator 123, RF modulator 124, airwave demodulator 131, signal processor 150, connection controller 160, and primary-secondary determiner 161 are implemented as, for example, the CPU executes control programs stored in the memory or the like.

IR demodulator 111 demodulates an IR signal received by IR communicator 110.

Code generator 112 obtains information included in the IR signal demodulated by IR demodulator 111. Specifically, code generator 112 generates a code (a serial code) indicating information included in the IR signal, based on the IR signal demodulated by IR demodulator 111. Key processor 152 (described later) executes various processes based, for example, on a code received from code generator 112.

RF demodulator 123 demodulates an RF signal received by RF receiver 121.

RF modulator 124 modulates an RF signal generated by signal processor 150 (by wireless signal processor 151, to be more specific).

Airwave demodulator 131 demodulates a broadcast signal received by airwave receiver 130.

Signal processor 150 obtains information included in the IR signal received by IR communicator 110, information included in the RF signal received by RF receiver 121, and information included in the broadcast signal received by airwave receiver 130, and executes various processes based on these obtained items of information. Signal processor 150 includes wireless signal processor 151, key processor 152, audio reproducer 153, and video reproducer 154.

Wireless signal processor 151 obtains information included in the RF signal demodulated by RF demodulator 123 and causes key processor 152 and connection controller 160 to execute various processes based on the obtained information.

Key processor 152 executes various processes that are based on the respective items of information included in an IR signal and in an RF signal received from operation device 200. For example, the user operates operation device 200 to configure various settings of main body device 100. Operation device 200 includes, for example, a plurality of buttons and transmits, to main body device 100, a signal that includes information (a key) corresponding to the button that the user has pressed. Based on this information, key processor 152 executes various processes concerning main body device 100. Examples of these various processes include a process of operating the channels, a process of operating the volume, or a process of moving and setting the cursor.

Audio reproducer 153 obtains and reproduces information (audio information) included in the broadcast signal received by airwave receiver 130, and outputs reproduction data, which is data reproducing the audio information, to audio outputter 170 or wireless signal processor 151.

Video reproducer 154 obtains information (video information) included in the broadcast signal received by airwave receiver 130 and, based on the obtained video information, causes display 180 to output a video.

Connection controller 160 changes the state of connection of wireless communication between main body device 100 and operation device 200 and between main body device 100 and communication device 300. Specifically, connection controller 160 performs a process of switching the state of connection of wireless communication between main body device 100 and operation device 200 between a connected state (the communicating state) and a non-connected state (the disconnected state). In a similar manner, connection controller 160 switches the state of connection of wireless communication between main body device 100 and communication device 300 between the communicating state and the disconnected state.

In this example, the communicating state is, for example, a state in which main body device 100 is in a state of being in wireless communication with operation device 200 and in which controller 140 demodulates an RF signal received from operation device 200 to obtain information included in the RF signal and executes a process in accordance with the obtained information. In other words, in the communicating state, main body device 100 receives an RF signal from operation device 200.

Meanwhile, the disconnected state is, for example, a state in which main body device 100 is in a state of being out of wireless communication with operation device 200 and in which controller 140 refrains from processing any RF signal other than an RF signal that includes a connection command (described later) received from operation device 200. In other words, in the present specification, the disconnected state is not a state in which no wireless communication is carried out but a state in which main body device 100 and operation device 200 can each receive an RF signal that includes a connection command.

For example, in the disconnected state according to the present embodiment, main body device 100 refrains from transmitting any RF signal. Moreover, for example, in the disconnected state, while main body device 100 is in a state of being capable of receiving an RF signal from operation device 200, even if main body device 100 receives an RF signal other than an RF signal that includes a connection command, main body device 100 refrains from performing any process that is based on the received RF signal.

Meanwhile, for example, operation device 200 refrains from transmitting any RF signal other than an RF signal that includes a connection command. Moreover, for example, in the disconnected state, while operation device 200 is in a state of being capable of receiving an RF signal from main body device 100, even if operation device 200 receives an RF signal other than an RF signal that includes a connection command, operation device 200 refrains from performing any process that is based on the received RF signal.

In the present specification, the communicating state or the disconnected state each refer to the state shared by main body device 100 and operation device 200.

Meanwhile, if operation device 200 enters a sleep mode (a power saving mode) (described later) while in the communicating state, operation device 200 stops wireless communication. Therefore, while in the sleep mode, operation device 200 neither receives a POLL signal nor transmits an ACK. With this configuration, while operation device 200 is in the sleep mode, main body device 100 as well as operation device 200 enters the disconnected state as a result.

Connection controller 160 communicates with communication device 300 via RF communicator 120 to determine whether connection controller 160 can determine the timing of transmitting or receiving a signal to or from communication device 300 via RF communicator 120. If connection controller 160 determines that connection controller 160 cannot determine such a timing, connection controller 160 executes a switching process that causes operation device 200 to transmit an operation signal in the communication scheme in which IR light is used. According to the present embodiment, in the switching process described above, connection controller 160 causes operation device 200 to transmit an operation signal in the communication scheme in which IR light is used, by transmitting, to operation device 200 via RF communicator 120, a switch signal (a first command (described later)) that causes operation device 200 to transmit an operation signal in the communication scheme in which IR light is used.

Moreover, for example, connection controller 160 repeatedly transmits, to operation device 200, a POLL signal for synchronizing with operation device 200 after having executed pairing to operation device 200, and in the switching process described above, connection controller 160 repeatedly transmits a POLL signal to operation device 200 even after having transmitted a switch signal.

Primary-secondary determiner 161 determines a primary-secondary relationship between main body device 100 and another device with which main body device 100 communicates wirelessly (operation device 200 or communication device 300, according to the present embodiment). For example, when wireless signal processor 151 is to execute wireless communication using an RF signal with operation device 200 and with communication device 300, wireless signal processor 151 first executes pairing to operation device 200 and to communication device 300.

In this example, pairing is a process of exchanging, between devices that are to communicate wirelessly, information necessary for the devices to carry out wireless communication therebetween with use of an RF signal, and examples of such information include a MAC address. Specifically, exchanged in pairing is an encryption key for carrying out secure wireless communication, that is, wireless communication in which a signal, even if it is intercepted by a third party, cannot be deciphered by the third party. As main body device 100 executes pairing to operation device 200 and to communication device 300, main body device 100 enters a state in which main body device 100 is capable of communicating wirelessly with operation device 200 and communication device 300 to exchange various items of information securely in the form of an RF signal.

Primary-secondary determiner 161 determines the primary-secondary relationship between main body device 100 and operation device 200 and between main body device 100 and communication device 300. When main body device 100 executes pairing, the primary-secondary relationship between main body device 100 and operation device 200 and the primary-secondary relationship between main body device 100 and communication device 300 are determined based on a condition set in advance by a standard or the like. Primary-secondary determiner 161 determines, in relation to each of operation device 200 and communication device 300, whether main body device 100 is set as being primary or being secondary.

Audio outputter 170 is a device that, under the control of audio reproducer 153, outputs audio that is based on the audio information described above. Audio outputter 170 is implemented by, for example but not limited to, an amplifier or a loudspeaker.

Display 180 is a device that, under the control of video reproducer 154, outputs a video that is based on the video information described above. Display 180 is, for example, a display device.

<Operation Device>

FIG. 3 is a block diagram illustrating a configuration of operation device 200 according to Embodiment 1.

Operation device 200 includes operator 210, IR communicator 220, RF communicator 230, and controller 240.

RF communicator 230 is an example of a first communicator that operation device 200 includes.

IR communicator 220 is an example of a second communicator that operation device 200 includes.

Operator 210 is a receiver that receives a user operation. Operator 210 is, for example, a push button. If suffices that operator 210 be capable of receiving a user operation, and operator 210 may be a touch panel or the like or a microphone or the like capable of receiving an audio input from the user.

IR communicator 220 is a communication interface for receiving a signal in the second communication scheme. According to the present embodiment, IR communicator 220 is a communication interface for communicating with main body device 100 with use of an IR signal. Specifically, IR communicator 220 is a communication interface, such as a light source that emits IR light, for transmitting an IR signal modulated by IR modulator 221 (described later).

RF communicator 230 is a communication interface for transmitting and receiving a signal in the first communication scheme. According to the present embodiment, RF communicator 230 is a communication interface for communicating with main body device 100 with use of an RF signal. RF communicator 230 includes RF receiver 231 and RF transmitter 232.

RF transmitter 232 is a communication interface, such as an antenna, for transmitting an RF signal modulated by RF modulator 234 (described later).

RF receiver 231 is a communication interface, such as an antenna, for receiving an RF signal from main body device 100.

Controller 240 is a processor that executes various processes. For example, controller 240 transmits a signal (an operation signal) to main body device 100 via IR communicator 220 or RF communicator 230.

Controller 240 is implemented, for example, by a CPU and a control program stored in a memory (not illustrated) of operation device 200, such as a ROM, a RAM, an HDD, or an SSD. Such a memory, for example, stores various items of information concerning operation device 200, such as a MAC address of operation device 200. Such a memory also stores, for example, various items of information, such as a MAC address of main body device 100, that, if operation device 200 has executed pairing to main body device 100, operation device 200 uses to communicate wirelessly with main body device 100 with use of an RF signal.

Moreover, if controller 240 determines that main body device 100 has executed a switching process to cause operation device 200 to transmit an operation signal in the communication scheme in which IR light is used (if controller 240 determines that a first command has been received, according to the present embodiment), controller 240 transmits an operation signal in the communication scheme in which IR light is used. Meanwhile, if controller 240 determines that main body device 100 has not executed the switching process (if controller 240 determines that a second command has been received, according to the present embodiment), controller 240 transmits an operation signal in Bluetooth (registered trademark). In other words, controller 240 transmits an operation signal in an IR signal if main body device 100 has executed the switching process described above or transmits an operation signal in an RF signal if main body device 100 has not executed the switching process described above.

According to the present embodiment, if controller 240 has received, from main body device 100 via RF communicator 230, a switch signal that causes controller 240 to transmit an operation signal in the communication scheme in which IR light is used, controller 240 determines that main body device 100 has executed the switching process. Thus, controller 240 transmits an operation signal in the communication scheme in which IR light is used.

Moreover, for example, controller 240 repeatedly receives, from main body device 100, a POLL signal for synchronizing with main body device 100 and repeatedly transmits, to main body device 100, a response signal (an ACK (described later)) responding to the received POLL signal. Thus, controller 240 maintains the state of being in communication with main body device 100. At this point, controller 240 according to the present embodiment repeatedly transmits an ACK to main body device 100 even after having received a switch signal.

Controller 240 includes, function-wise, key detector 211, serial converter 212, transmission switcher 250, signal processor 260, IR modulator 221, RF modulator 234, and RF demodulator 233. Respective processes executed by key detector 211, serial converter 212, transmission switcher 250, signal processor 260, IR modulator 221, RF modulator 234, and RF demodulator 233 are implemented as, for example, the CPU executes control programs stored in the memory or the like.

Key detector 211 detects an instruction that the user inputs via operator 210. In other words, key detector 211 detects an instruction from the user received by operator 210. Specifically, key detector 211 detects (obtains) information (a key) indicating an instruction corresponding to a button pressed in operator 210. Alternatively, in a case where operator 210 is a microphone, key detector 211 may obtain audio information from operator 210 and detect a key indicating an instruction that is based on the obtained audio information.

Serial converter 212 converts the information (the key) detected by key detector 211 to a serial code. In other words, the information that key detector 211 has detected is expressed in a serial code.

Transmission switcher 250 makes a switch as to whether the information expressed in a serial code generated by serial converter 212 is to be transmitted via IR communicator 220 or RF communicator 230.

Specifically, if transmission switcher 250 determines that main body device 100 has executed a switching process to cause operation device 200 to transmit an operation signal in the communication scheme in which IR light is used (if transmission switcher 250 determines that a first command has been received, according to the present embodiment), transmission switcher 250 transmits an operation signal in the communication scheme in which IR light is used. Meanwhile, if transmission switcher 250 determines that main body device 100 has not executed the switching process (if transmission switcher 250 determines that a second command has been received, according to the present embodiment), transmission switcher 250 transmits an operation signal in Bluetooth (registered trademark). According to the present embodiment, if transmission switcher 250 has received, from main body device 100 via RF communicator 230, a switch signal (a first command, according to the present embodiment) that causes transmission switcher 250 to transmit an operation signal in the communication scheme in which IR light is used, transmission switcher 250 determines that main body device 100 has executed the switching process. Thus, transmission switcher 250 transmits an operation signal in the communication scheme in which IR light is used.

Moreover, for example, transmission switcher 250 repeatedly receives, from main body device 100, a POLL signal for synchronizing with main body device 100, repeatedly transmits, to main body device 100, an ACK responding to the received POLL signal, and repeatedly transmits an ACK to main body device 100 even after having received a switch signal.

Signal processor 260 processes an IR signal and an RF signal that operation device 200 transmits and an RF signal received from main body device 100. For example, when signal processor 260 is to transmit an IR signal via IR communicator 220, signal processor 260 generates an IR signal that includes information expressed in a serial code generated by serial converter 212. Alternatively, for example, when signal processor 260 is to transmit an RF signal via RF transmitter 232, signal processor 260 generates an RF signal that includes information expressed in a serial code generated by serial converter 212. Alternatively, for example, signal processor 260 obtains information included in an RF signal demodulated by RF demodulator 233 and executes various processes based on the obtained information.

IR modulator 221 modulates an IR signal generated by signal processor 260.

RF demodulator 233 demodulates an RF signal received by RF receiver 231.

RF modulator 234 modulates an RF signal generated by signal processor 260.

[1-2. Operation]

Now, an operation of main body device 100 and of operation device 200 configured as described above will be described.

<Outline of Process of Communication System>

Figure 4:
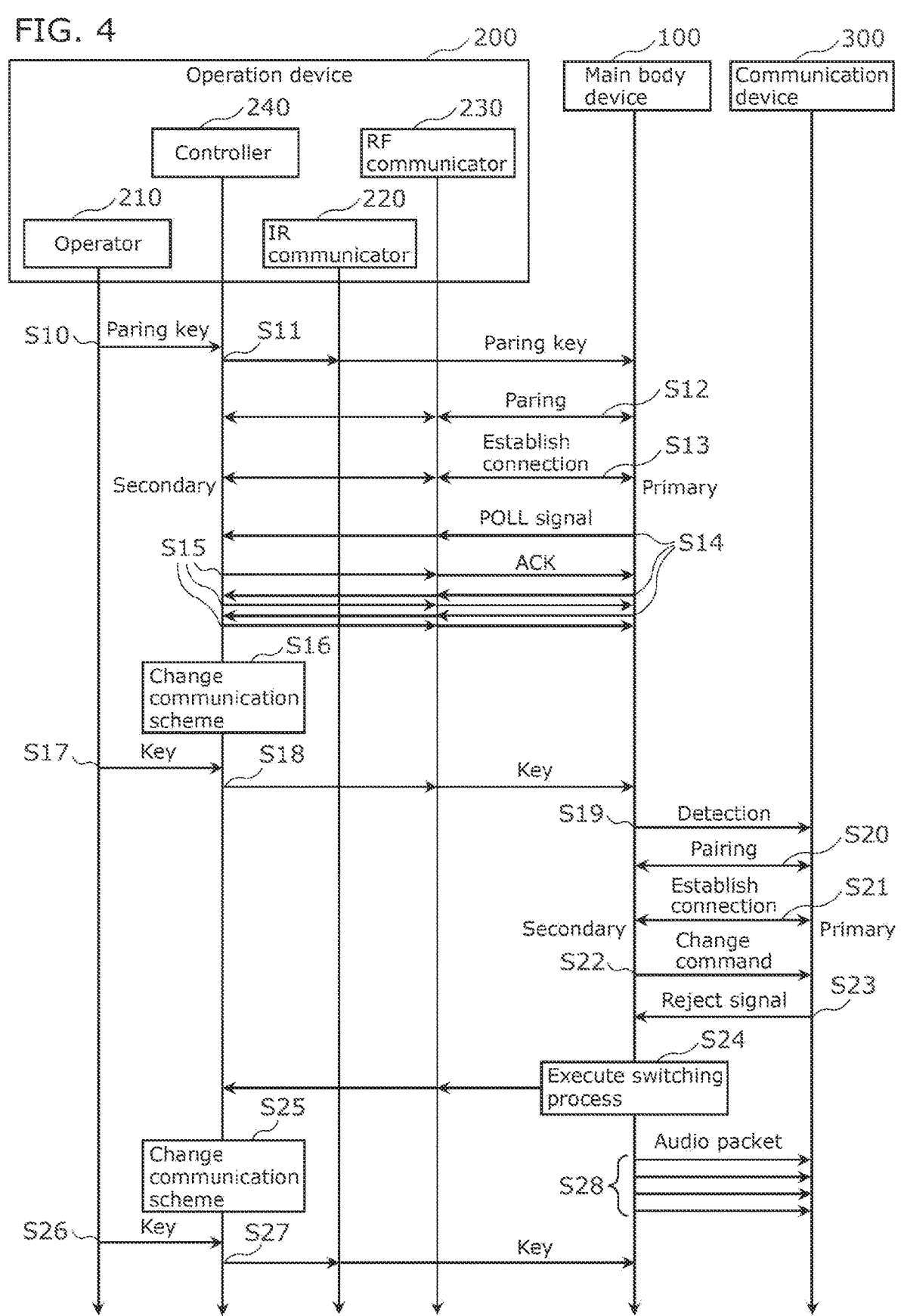
FIG. 4 is a sequence diagram illustrating an outline of processing procedures of the communication system according to Embodiment 1.

FIG. 4 is a sequence diagram illustrating an outline of processing procedures of communication system 400 according to Embodiment 1.

First, operator 210 receives, from a user, an input (a key input) that causes operation device 200 and main body device 100 to execute pairing (step S10).

Next, based on the key that operator 210 has received, controller 240 transmits, to main body device 100 via IR communicator 220, an IR signal that includes a key (a pairing key) for causing main body device 100 and operation device 200 to execute pairing (step S11).

In this example, main body device 100 and operation device 200 are in a state of being constantly capable of wireless communication with use of IR light.

Next, in response to receiving the IR signal that includes the pairing key, main body device 100 executes pairing to operation device 200 (step S12). Specifically, main body device 100 executes pairing for wireless communication in which main body device 100 communicates wirelessly with operation device 200 via an RF signal. With the above operation, main body device 100 and operation device 200 become paired to each other.

Next, main body device 100 and operation device 200 establish a connection for wireless communication so that main body device 100 and operation device 200 enter the communicating state of being capable of communicating with each other wirelessly with use of an RF signal (step S13).

In a state in which wireless communication is established between main body device and operation device 200 (in the communicating state), main body device 100 and operation device 200 each operate in accordance with information included in an RF signal transmitted and received between main body device 100 and operation device 200. Moreover, main body device 100 and operation device 200 transmit, to each other, a POLL signal and an acknowledgement (an ACK) that serves as a response signal responding to a POLL signal. Thus, main body device 100 and operation device 200 each check whether the state in which they can communicate via an RF signal (i.e., the communicating state) is maintained. Specifically, main body device 100 transmits a POLL signal to operation device 200 (step S14), and operation device 200 transmits an ACK to main body device 100 as a response to the received POLL signal (step S15).

In this manner, even in a case where operation device 200 does not, for an extended period of time, transmit information indicating a user operation to main body device 100, main body device 100 and operation device 200 transmit a POLL signal and an ACK to each other, and can thus remain in wireless communication with use of an RF signal. In other words, main body device 100 and operation device 200 maintain their communicating state.

Meanwhile, when the connection for wireless communication is established between main body device 100 and operation device 200 (step S13), the primary-secondary relationship between main body device 100 and operation device 200 is determined. The procedures with which the primary-secondary relationship between main body device 100 and operation device 200 is determined are defined in advance as desired by a standard or the like. In the present specification, main body device 100 is preset to become a master, and operation device 200 is preset to become a slave.

Next, controller 240 changes the mode (the communication scheme) such that, in the communicating state in which wireless communication in which an RF signal is used is established between operation device 200 and main body device 100, operation device 200 transmits a signal to main body device 100 in an RF signal (step S16).

Next, for example, in response to operator 210 receiving an operation from the user (step S17), controller 240 transmits a signal (a key packet) including a key that is based on the received operation to main body device 100 via RF communicator 230 (step S18).

At this point, main body device 100 detects communication device 300 (step S19). For example, main body device 100 transmits a check signal for checking whether there is a device around main body device 100 with which main body device 100 can communicate wirelessly via RF communicator 120. For example, in response to receiving a check signal, communication device 300 transmits a response signal responding to the received check signal to main body device 100. In response to receiving the response signal via RF communicator 120, main body device 100 determines that main body device 100 has detected a device.

In this example, main body device 100 does not have to transmit a check signal via RF communicator 120 in order to detect a device. In this case, for example, communication device 300 transmits a pairing signal for executing pairing to main body device 100. In response to receiving the pairing signal via RF communicator 120, main body device 100 may determine that main body device 100 has detected a device.

In response to detecting communication device 300 after step S18, for example, main body device 100 executes pairing to communication device 300 (step S20).

Next, main body device 100 and communication device 300 establish a connection for communication so that main body device 100 and communication device 300 enter the communicating state of being capable of communicating with each other wirelessly with use of an RF signal (step S21).

In this example, communication device 300 is preset to become a master. In this case, main body device 100 becomes a slave in accordance with the setting of communication device 300 and establishes communication with communication device 300.

Moreover, in this case, since main body device 100 is a master in the primary-secondary relationship to operation device 200, main body device 100 transmits, to communication device 300, a request signal (a change command) requesting communication device 300 to change the primary-secondary relationship such that main body device 100 becomes a master in the primary-secondary relationship to communication device 300 (step S22).

In this example, communication device 300 is preconfigured to become a master and not to become a slave. In this case, for example, after step S22, communication device 300 refrains from performing a process of becoming a slave and transmits, to main body device 100, a reject signal indicating that communication device 300 has rejected the request from main body device 100 (step S23).

As described above, if main body device 100 continues to communicate wirelessly with both operation device 200 and communication device 300 with use of an RF signal, a data collision can occur between an RF signal received from operation device 200 and an RF signal received from communication device 300. If a data collision occurs, for example, main body device 100 may fail to receive a part or all of the plurality of items of data that main body device 100 is supposed to receive.

Therefore, in response to receiving the reject signal transmitted from communication device 300 at step S23, main body device 100 executes a switching process that causes operation device 200 to transmit a signal with use of not an RF signal but an IR signal (step S24). According to the present embodiment, as the switching process, main body device 100 executes a process of transmitting, to operation device 200, an RF signal that includes a command (a first command) that causes operation device 200 to transmit a signal in an IR signal.

In response to main body device 100 executing the switching process at step S24, controller 240, for example, changes the mode (the communication scheme) such that operation device 200 transmits not an RF signal but an IR signal when transmitting a signal that includes a key (step S25). According to the present embodiment, in response to receiving an RF signal that includes a first command from main body device 100 via RF communicator 230, controller 240, for example, changes the mode such that, when operation device 200 transmits a signal that includes a key to main body device 100, operation device 200 transmits the signal in an IR signal.

With this operation, for example, in response to operator 210 receiving an operation from the user after step S25 (step S26), controller 240 transmits, to main body device 100 via IR communicator 220, an RF signal (a key packet) that includes a key that is based on the received operation (step S27).

Meanwhile, after step S24, main body device 100 transmits, for example, audio information (specifically, reproduction data, or more specifically an audio packet that includes the reproduction data) to communication device 300 (step S28). With this operation, the user can listen to the audio that is based on the audio packet with use of communication device 300. In addition, a data collision can be suppressed even if main body device 100 communicates with both operation device 200 and communication device 300.

Although not included in the figure, in response to communication being established at step S21 between main body device 100 and communication device 300, as with the case of main body device 100 and operation device 200, main body device 100 and communication device 300 transmit a POLL signal and an ACK to each other to maintain their communicating state.

<Main Body Device>

Figure 5:
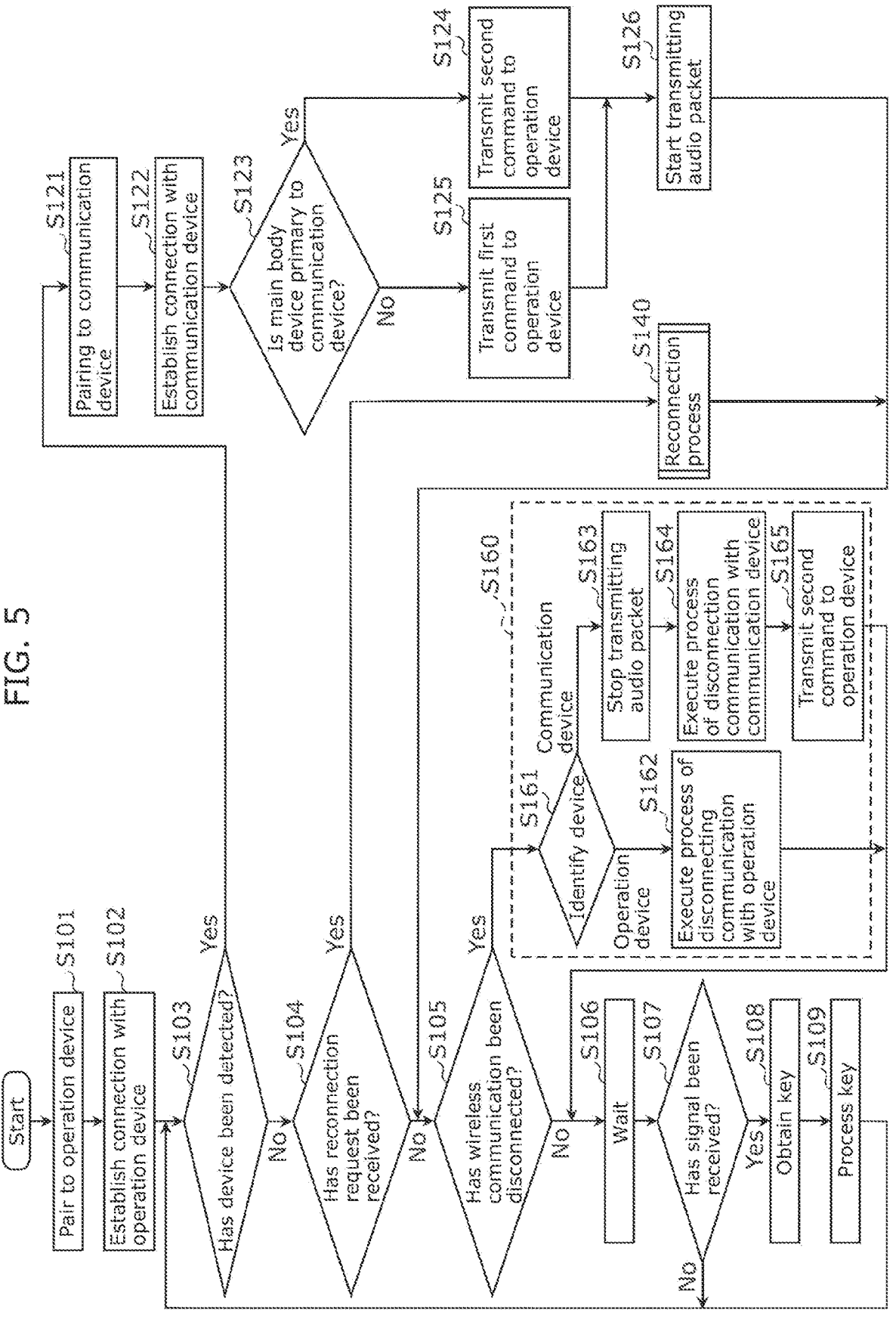
FIG. 5 is a flowchart illustrating processing procedures of the main body device according to Embodiment 1.

FIG. 5 is a flowchart illustrating processing procedures of main body device 100 according to Embodiment 1.

First, controller 140 starts a pairing process of pairing to operation device 200 (step S101). As described in relation to step S10 to step S12 of FIG. 4, by operating operator 210, the user, for example, causes operation device 200 to transmit, to main body device 100, an IR signal indicating a key (a pairing key) for executing the pairing process between main body device 100 and operation device 200. In response to receiving the IR signal indicating the pairing process, controller 140 executes the pairing process of pairing to operation device 200 by communicating wirelessly with operation device 200 via an RF signal.

Next, controller 140 enters a communicating state in which a connection is established that allows controller 140 to communicate wirelessly with operation device 200 via RF communicator 120 (step S102). If the state has been switched from a disconnected state to the communicating state, controller 140 starts transmitting a POLL signal at regular intervals.

Next, controller 140 determines whether controller 140 has detected a device with which controller 140 can communicate wirelessly (step S103). As described in relation to step S19 of FIG. 4, for example, controller 140 determines whether controller 140 has received, via RF communicator 120, a response signal serving as a response to a check signal.

If controller 140 has detected a device with which controller 140 can communicate wirelessly (Yes at step S103), controller 140 executes a pairing process of pairing to this device (step S121). The processes following step S121 will be described later.

Meanwhile, if controller 140 fails to detect any device with which controller 140 can communicate wirelessly (No at step S103), controller 140 determines whether any device for which a pairing process has already been executed and that has been out of a communicating state has reconnected to controller 140. In other words, controller 140 determines whether controller 140 has been requested to reenter a communicating state with such a device (step S104). For example, controller 140 determines whether controller 140 has received, via IR communicator 110 or RF communicator 120, an RF signal that includes a connection command indicating a request for reestablishing a communicating state from a device for which a pairing process has already been executed and that has been out of a communicating state (i.e., has been in a disconnected state).

If controller 140 has been reconnected by a device for which a pairing process has already been executed and that has been out of a communicating state (Yes at step S104), controller 140 executes a reconnection process (step S140).

The details of the reconnection process (step S140) will be described later.

Meanwhile, if controller 140 is not reconnected by any device for which a pairing process has already been executed and that has been out of a communicating state (No at step S104), controller 140 determines whether wireless communication with a device for which a pairing process has already been executed and that is in a communicating state has been disconnected (step S105). For example, controller 140 determines whether controller 140 has received, from operation device 200 via RF communicator 120, an ACK serving as a response to a POLL signal that controller 140 has transmitted to operation device 200 via RF communicator 120, within a predetermined time since the transmission of the POLL signal. For example, if controller 140 fails to receive, from operation device 200, an ACK serving as a response to a POLL signal that controller 140 has transmitted to operation device 200 via RF communicator 120, within a predetermined time since the transmission of the POLL signal, controller 140 determines that wireless communication with operation device 200 has been disconnected.

In this example, the predetermined time may be set in advance as desired. Main body device 100 may include a timer, such as a real time clock (RTC), for measuring the time.

If controller 140 determines that wireless communication with the device in the communicating state has been disconnected (Yes at step S105), controller 140 executes a disconnecting process (step S160). For example, controller 140 executes the disconnecting process if controller 140 fails to receive an ACK via RF communicator 120 within a predetermined time after controller 140 has transmitted a POLL signal via RF communicator 120.

The details of the disconnecting process (step S160) will be described later.

Meanwhile, if controller 140 determines that wireless communication with the device in the communicating state has not been disconnected (No at step S105), controller 140 waits (a connection interval) until controller 140 receives a signal (a packet) from this device or until a predetermined time passes (step S106).

At this point, if controller 140 has received a signal (a packet) from the device that is in the communicating state (e.g., operation device 200) (Yes at step S107), controller 140 decrypts the packet (e.g., obtains information (a key) included in the signal by demodulating the signal) (step S108), executes a process in accordance with an instruction indicated by the key (step S109), and returns the process to step S103.

Meanwhile, if controller 140 fails to receive a signal (a packet) from the device that is in the communicating state (e.g., operation device 200) within a predetermined time (No at step S107), controller 140 returns the process to step S103.

In this example, in the loop spanning from step S103 to step S109, main body device 100 executes, at regular intervals, a key process and a set of processes including detecting a connection or a disconnect of wireless communication between main body device 100 and operation device 200 and between main body device 100 and communication device 300 and performing a process corresponding to this detection.

The primary-secondary relationship is determined (or redetermined) between main body device 100 and operation device 200 and between main body device 100 and communication device 300 both when main body device 100 establishes a connection for wireless communication with operation device 200 or with communication device 300 for the first time and when main body device 100 reestablishes a connection for wireless communication with operation device 200 or with communication device 300.

As described above, if controller 140 has detected, for example, communication device 300 at step S121, controller 140 executes a pairing process of pairing to communication device 300.

Next, main body device 100 and communication device 300 establish a connection for wireless communication therebetween so that main body device 100 and communication device 300 enter a communicating state in which they can communicate with each other wirelessly with use of an RF signal (step S122). If the state has been switched from a disconnected state to the communicating state, communication device 300 transmits a POLL signal to main body device 100 at regular intervals, and main body device 100 transmits, to communication device 300, an ACK responding to the received POLL signal.

Next, primary-secondary determiner 161 determines whether main body device 100 is primary and communication device 300 is secondary (step S123).

If primary-secondary determiner 161 determines that main body device 100 is primary (Yes at step S123), controller 140 transmits, to operation device 200 via RF communicator 120, a signal that includes a second command serving as information indicating an instruction that causes operation device 200 to transmit an RF signal (step S124). In other words, if main body device 100 is a master to communication device 300, operation device 200 transmits, to main body device 100, an RF signal that includes information (a key) received by operator 210.

Meanwhile, if primary-secondary determiner 161 determines that main body device 100 is secondary (No at step S123), controller 140 transmits, to operation device 200 via RF communicator 120, a signal that includes a first command serving as information indicating an instruction that causes operation device 200 to transmit an IR signal (step S125). In other words, if main body device 100 is a slave to communication device 300, operation device 200 transmits, to main body device 100, information (a key) received by operator 210 in the form of an IR signal.

In this example, if primary-secondary determiner 161 determines that main body device 100 is a slave and communication device 300 is a master, controller 140 may refrain from executing step S125 immediately. In that case, as described in relation to step S22 of FIG. 4, controller 140 may transmit a request signal to communication device 300 to request communication device 300 to change the primary-secondary relationship such that main body device 100 becomes a master. Thereafter, controller 140 may make a determination of No at step S123 in response to receiving, via RF communicator 120, a reject signal from communication device 300 indicating that communication device 300 has rejected the request.

In this manner, controller 140 executes the switching process described in relation to step S24 of FIG. 4 by executing step S124 or step S125.

Next, after executing step S124 or step S125, controller 140, for example, starts transmitting, to communication device 300 via RF communicator 120, an audio packet of audio processed by audio reproducer 153 and output by audio outputter 170 (step S126), and then moves the process to step S105.

In this example, after executing step S126, controller 140 continues to transmit audio packets until transmission of audio packets is stopped at step S163 (described later).

Figure 6:
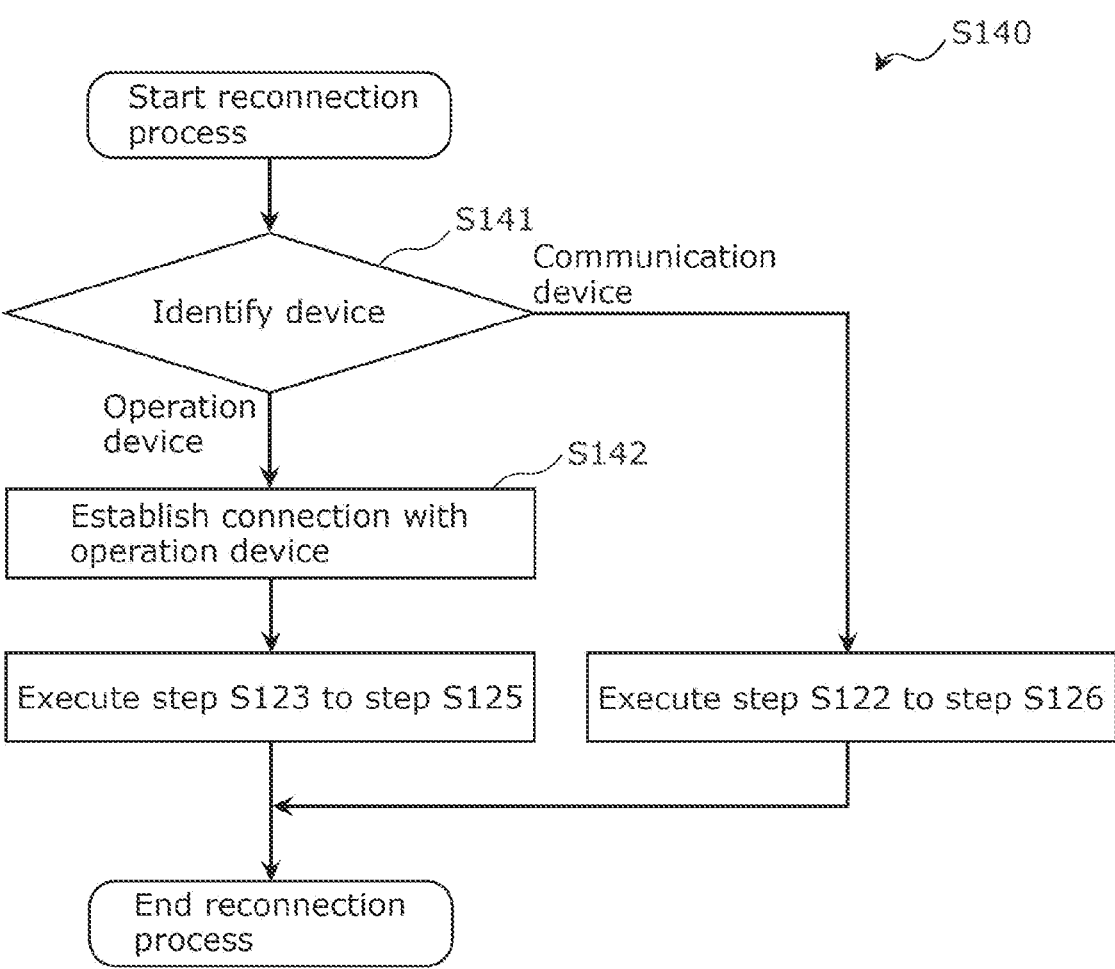
FIG. 6 is a flowchart illustrating a reconnection process that the main body device according to Embodiment 1 executes.

FIG. 6 is a flowchart illustrating the reconnection process that main body device 100 according to Embodiment 1 executes. Specifically, FIG. 6 is a flowchart illustrating the details of step S140 of FIG. 5.

Controller 140 determines whether the reconnected device is operation device 200 or communication device 300 (step S141). For example, controller 140 determines whether controller 140 has received a signal (an RF signal that includes a connection command) requesting a reconnection from operation device 200 or received a signal requesting a reconnection from communication device 300.

If controller 140 has received a signal requesting a reconnection from communication device 300 ("Communication device" at step S141), controller 140 executes processes similar to the processes at step S122 to step S126 of FIG. 5.

Meanwhile, if controller 140 has received a signal requesting a reconnection from operation device 200 ("Operation device" at step S141), controller 140 establishes a communication connection with operation device 200 to enter the communicating state from the disconnected state (step S142) and executes processes similar to the processes at step S123 to step S125 of FIG. 5.

In other words, in the reconnection process with operation device 200 or with communication device 300, since main body device 100 has already executed a pairing process of pairing to each of operation device 200 and communication device 300, main body device 100 can enter the communicating state without having to perform the pairing process again.

Referring back to FIG. 5, in the disconnecting process (step S160), controller 140 determines whether the device with which communication carried out via an RF signal has been disconnected is operation device 200 or communication device 300 (step S161). For example, controller 140 determines whether the device that has transmitted an ACK when controller 140 has failed to receive an ACK responding to a POLL signal that controller 140 has transmitted via RF communicator 120 is operation device 200 or communication device 300.

If controller 140 determines that the device with which communication carried out via an RF signal has been disconnected is operation device 200 ("Operation device" at step S161), controller 140 executes the disconnecting process of disconnecting communication in which controller 140 communicates with operation device 200 in an RF signal (step S162). For example, controller 140 stops transmitting a POLL signal to operation device 200 via RF communicator 120.

Meanwhile, if controller 140 determines that the device with which communication carried out via an RF signal has been disconnected is communication device 300 ("Communication device" at step S161), controller 140 stops transmitting an RF signal indicating an audio packet to communication device 300 via RF communicator 120 (step S163).

Next, controller 140 executes the disconnecting process of disconnecting communication with communication device 300 (step S164). For example, controller 140 stops transmitting a POLL signal to communication device 300 via RF communicator 120. With this operation, main body device 100 enters the disconnected state of being disconnected from communication device 300.

Next, controller 140 transmits an RF signal indicating a second command to operation device 200 via RF communicator 120 (step S165). In other words, if main body device 100 is not to communicate wirelessly with communication device 300, main body device 100 causes operation device 200 to transmit a key packet in an RF signal when operation device 200 transmits the key packet.

<Operation Device>

Figure 7:
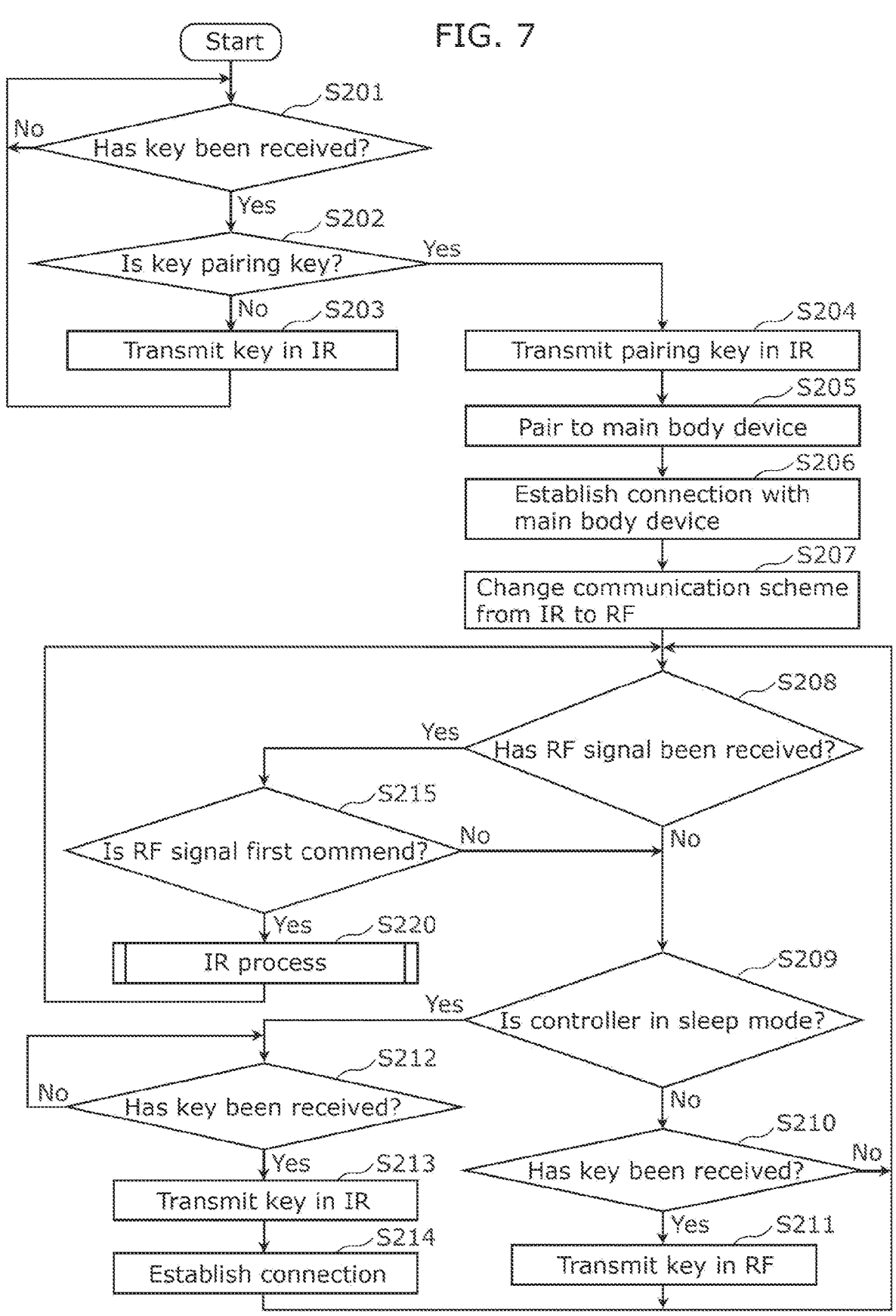
FIG. 7 is a flowchart illustrating processing procedures of the operation device according to Embodiment 1.

FIG. 7 is a flowchart illustrating processing procedures of operation device 200 according to Embodiment 1.

In the flowchart illustrated in FIG. 7, initially, main body device 100 and operation device 200 are in a state in which they have not established a connection for wireless communication in which an RF signal is used.

First, controller 240 determines whether operator 210 has received an instruction from the user. In other words, controller 240 determines whether operator 210 has received an input of a key (step S201).

If operator 210 has not received any input of a key (No at step S201), controller 240 repeats the process at step S201.

Meanwhile, if operator 210 has received an input of a key (Yes at step S201), controller 240 determines whether the received key is a pairing key instructing controller 240 to execute a pairing process of pairing to main body device 100 (step S202).

If controller 240 determines that the received key is not a pairing key (No at step S202), controller 240 transmits an IR signal indicating the received key via IR communicator 220 (step S203) and returns the process to step S201.

Meanwhile, if controller 240 determines that the received key is a pairing key (Yes at step S202), controller 240 transmits an IR signal indicating the pairing key via IR communicator 220 (step S204).

Next, controller 240 executes pairing to main body device 100 (step S205).

Next, controller 240 establishes a connection for communication with main body device 100 and thus enters the communicating state of being in communication with main body device 100 (step S206). If the state has been switched from a disconnected state to the communicating state, controller 240 transmits a POLL signal to main body device 100 at regular intervals.

Next, controller 240 switches the signal that controller 240 uses to transmit, to main body device 100, a signal that includes a key in response to operator 210 receiving an input of a key from an IR signal to an RF signal (step S207).

Next, controller 240 determines whether controller 240 has received an RF signal (an RF packet) via RF communicator 230 (step S208).

If controller 240 has received an RF signal (Yes at step S208), controller 240 determines whether the received RF signal is an RF signal indicating a first command (step S215).

If controller 240 determines that the received RF signal is a signal that includes a first command (Yes at step S215), controller 240 executes a process for wireless communication that uses an IR signal (this process is also referred to below simply as an IR process) (step S220). The IR process will be described later.

If controller 240 has not received any RF signal (No at step S208) or if the received RF signal is not an RF signal indicating a first command (No at step S215), controller 240 determines whether controller 240 is currently in a sleep mode or controller 240 is to enter a sleep mode later on (step S209). A sleep mode is a power saving state that controller 240 enters when operator 210 receives no input of a key for a predetermined time. For example, if operator 210 receives no operation from the user for ten seconds, controller 240 enters a sleep mode. Moreover, in a sleep mode, the communication with main body device 100 becomes disconnected (i.e., a state in which controller 240 transmits no ACK). In other words, in a sleep mode, the state of communication with main body device 100 is in the disconnected state.

If controller 240 is neither currently in a sleep mode nor to enter a sleep mode later on (No at step S209), and if controller 240 has received an input of a key (Yes at step S210), controller 240 transmits an RF signal indicating the received key to main body device 100 via RF communicator 230 (step S211).

Meanwhile, if controller 240 is neither currently in a sleep mode nor to enter a sleep mode later on (No at step S209), and if controller 240 has not received any input of a key (No at step S210), controller 240 returns the process to step S208.

Meanwhile, if controller 240 is currently in a sleep mode or is to enter a sleep mode later on (Yes at step S209), controller 240 determines whether operator 210 has received an input of a key (step S212).

If operator 210 has not received any input of a key (No at step S212), controller 240 remains in a sleep mode (or enters a sleep mode) and continues with the determination at step S212.

Meanwhile, if operator 210 has received an input of a key (Yes at step S212), controller 240 resumes from a sleep mode to return to a normal mode and transmits an IR signal indicating the received key (step S213).

Next, controller 240 transmits an RF signal that includes a connection command via RF communicator 230 to reestablish a connection for communication with main body device 100, and controller 240 enters, from the disconnected state, the communicating state of being in communication with main body device 100 (step S214). If the state has been switched from the disconnected state to the communicating state, controller 240 transmits, to main body device 100, an ACK responding to a POLL signal transmitted from main body device 100 at regular intervals.

FIG. 8 is a flowchart illustrating the IR process that operation device 200 according to Embodiment 1 executes. Specifically, FIG. 8 is a flowchart illustrating the details of step S220 of FIG. 7.

If controller 240 has received an RF signal indicating a first command via RF communicator 230 (Yes at step S215 of FIG. 7), controller 240 switches the signal that controller 240 transmits from an RF signal to an IR signal (step S221). In this example, main body device 100 and operation device 200 remain in the communicating state at step S221.

Next, controller 240 determines whether controller 240 has received an RF signal (an RF packet) via RF communicator 230 (step S222).

If controller 240 has received an RF signal (Yes at step S222), controller 240 determines whether information that the received RF signal includes is a second command (step S229).

If controller 240 determines that the information is a second command (Yes at step S229), controller 240 switches the signal that controller 240 transmits from an IR signal to an RF signal (step S230).

Meanwhile, if controller 240 fails to receive an RF signal within a predetermined time (No at step S222) or if the information is not a second command (No at step S229), controller 240 determines whether controller 240 is currently in a sleep mode or is to enter a sleep mode later on (step S223).

If controller 240 is in a sleep mode or is to enter a sleep mode (Yes at step S223), controller 240 executes the processes at step S212 to step S214 of FIG. 7 and returns the process to step S222.

Meanwhile, if controller 240 is neither currently in a sleep mode nor to enter a sleep mode later on (No at step S223), controller 240 determines whether operator 210 has received an input of a key (step S224).

If operator 210 has received an input of a key (Yes at step S224), controller 240 transmits an IR signal indicating the received key (step S225).

Meanwhile, if operator 210 has not received any input of a key (No at step S224), controller 240 returns the process to step S222.

<Switching Process>

Figure 9:
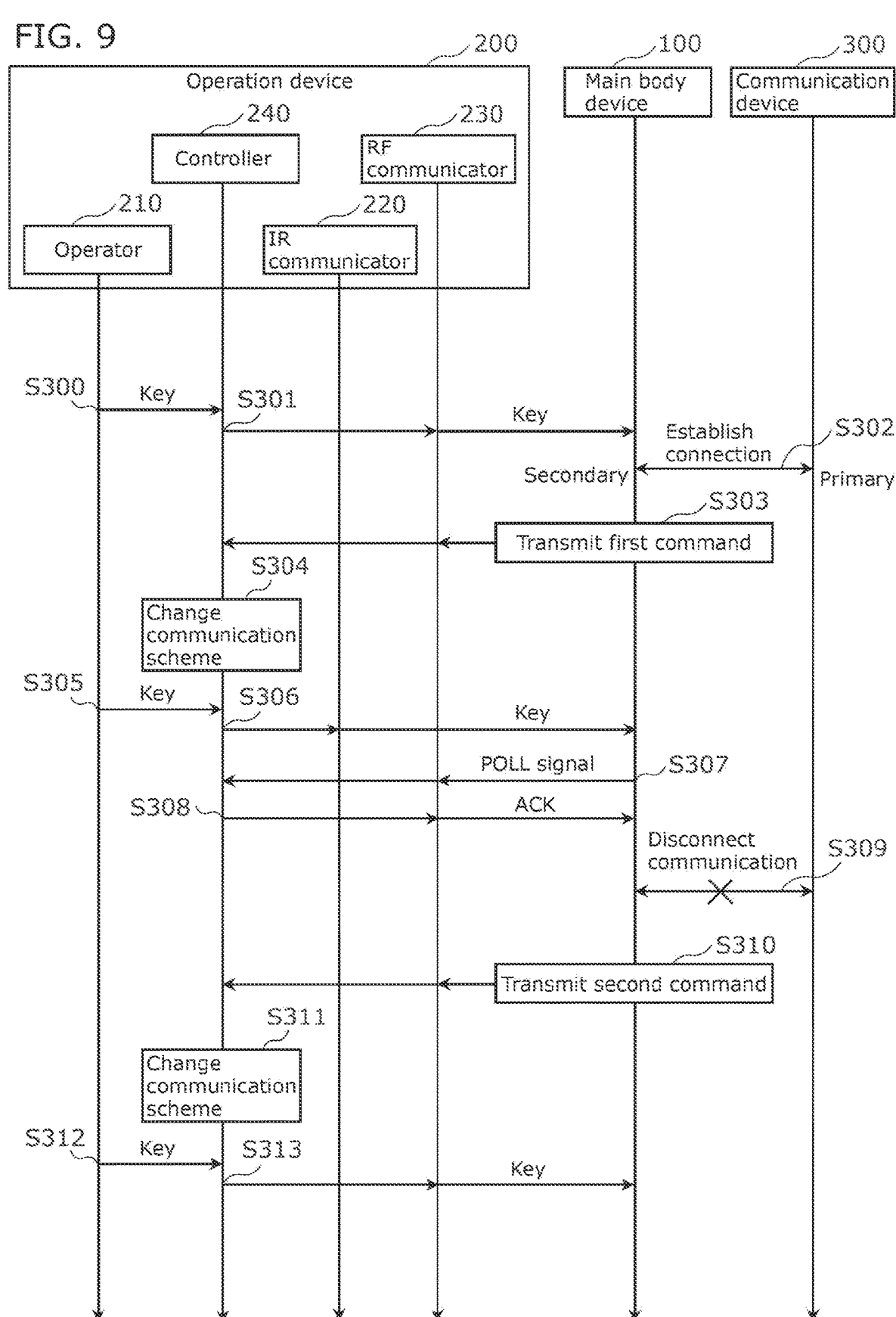
FIG. 9 is a sequence diagram illustrating processing procedures of a switching process performed in the communication system according to Embodiment 1.

FIG. 9 is a sequence diagram illustrating processing procedures of a switching process performed in communication system 400 according to Embodiment 1.

In the sequence diagram illustrated in FIG. 9, initially, communication is established between main body device 100 and operation device 200, but no communication is established between main body device 100 and communication device 300.

For example, operator 210 receives an input (a key input) from the user (step S300).

Next, controller 240 transmits an RF signal that includes the key received by operator 210 to main body device 100 via RF communicator 230 (step S301). Main body device 100 executes a process in accordance with the key included in the received RF signal.

At this point, main body device 100 establishes a connection for communication such that, for example, main body device 100 becomes a slave and communication device 300 becomes a master (step S302).

In this case, after step S302, as the switching process described above, main body device 100 transmits, to operation device 200, an RF signal that includes a first command that causes operation device 200 to transmit a signal in an IR signal (step S303).

In response to receiving the RF signal that includes the first command from main body device 100 via RF communicator 230, controller 240 changes the communication scheme such that, when operation device 200 transmits a signal that includes a key to main body device 100, operation device 200 transmits the signal in an IR signal.

With this operation, in response to operator 210 receiving an input (a key input) from the user (step S305), controller 240 transmits an IR signal that includes the key that operator 210 has received to main body device 100 via IR communicator 220 (step S306).

Meanwhile, according to the present embodiment, even in a case where operation device 200 has changed the communication scheme at step S304, main body device 100 and operation device 200 continue to transmit a POLL signal and an ACK to each other and thus maintain their communicating state (step S307 and step S308).

In this example, the communication between main body device 100 and communication device 300 becomes disconnected after step S302 (step S309). For example, main body device 100 fails to receive a POLL signal from communication device 300 within a predetermined time.

In this case, as the switching process described above, main body device 100 transmits, to operation device 200, an RF signal that includes a second command that causes operation device 200 to transmit a signal in an IR signal (step S310).

In response to receiving the RF signal that includes the second command from main body device 100 via RF communicator 230, controller 240 changes the communication scheme such that, when operation device 200 transmits a signal that includes a key to main body device 100, operation device 200 transmits the signal in an RF signal (step S311).

With this operation, in response to operator 210 receiving an input (a key input) from the user after step S309 (step S312), controller 240 transmits an RF signal that includes the key that operator 210 has received to main body device 100 via RF communicator 230 (step S313).

<Reconnection Process>

Figure 10:
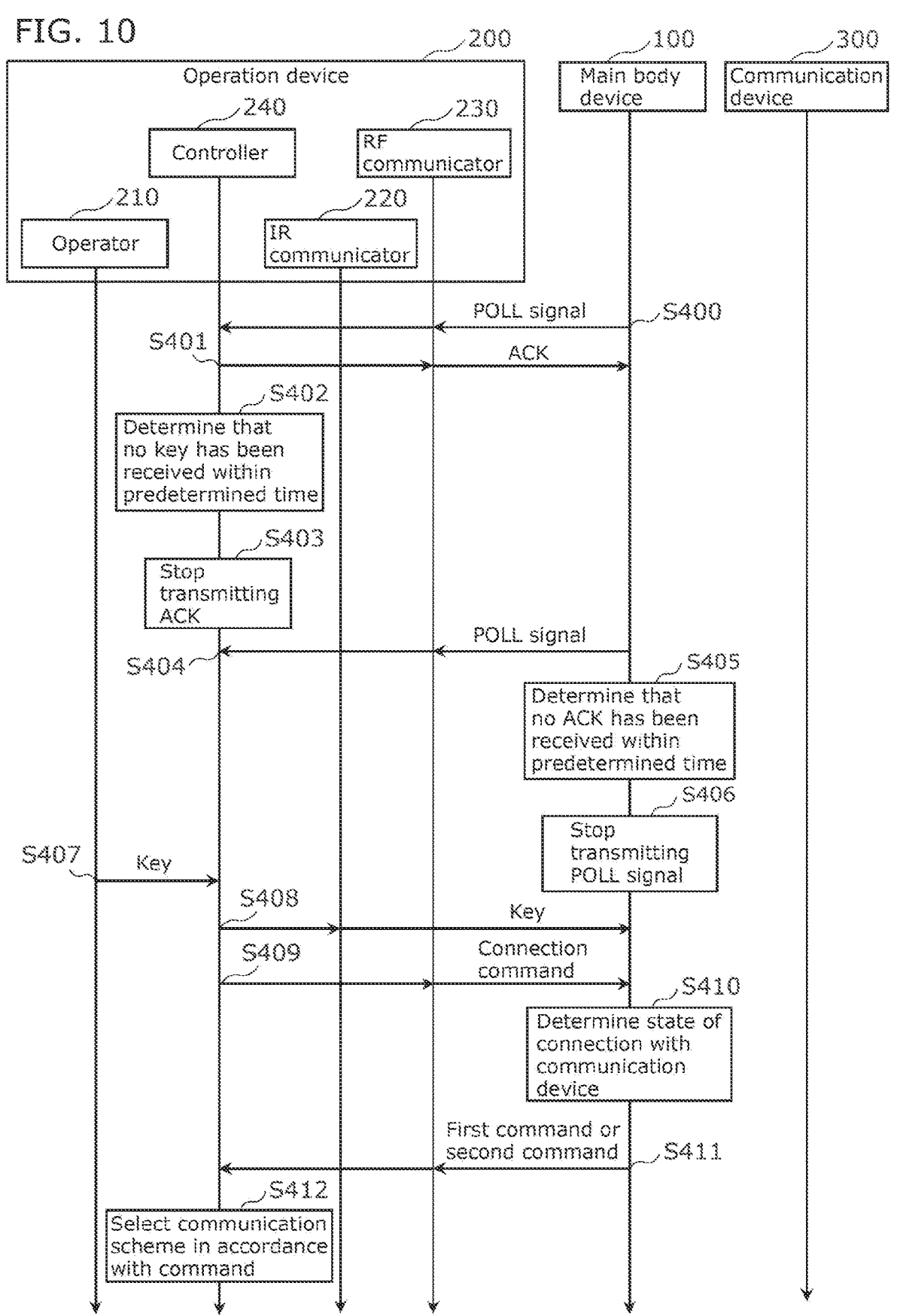
FIG. 10 is a sequence diagram illustrating an outline of processing procedures of a reconnection process performed in the communication system according to Embodiment 1.

FIG. 10 is a sequence diagram for describing a reconnection process performed in communication system 400 according to Embodiment 1.

In the sequence diagram illustrated in FIG. 10, initially, communication is established between main body device 100 and operation device 200, but no communication is established between main body device 100 and communication device 300.

Main body device 100 and operation device 200 continue to transmit a POLL signal and an ACK to each other and thus maintain their communicating state (step S400 and step S401).

At this point, in response to operation device 200 determining that operation device 200 has not received any input of a key from the user within a predetermined time (step S402), operation device 200 enters a sleep mode in which operation device 200 refrains from transmitting an ACK (step S403).

In this case, operation device 200 refrains from transmitting an ACK even if operation device 200 has received a POLL signal from main body device 100 (step S404).

In response to main body device 100 determining that main body device 100 has not received an ACK from operation device 200 within a predetermined time after having transmitted a POLL signal (step S405), main body device 100 stops transmitting a POLL signal (step S406). In other words, main body device 100 and operation device 200 enter the disconnected state in which the communication therebetween is disconnected.

Next, in response to operation device 200 receiving an input of a key from the user (step S407), operation device 200 cancels the sleep mode, that is, enters a normal mode in which operation device 200 transmits an ACK in response to receiving a POLL signal from a device with which communication is established, and operation device 200 transmits an IR signal that includes the received key to main body device 100 via IR communicator 220 (step S408).

Then, after step S407, operation device 200 transmits, to main body device 100 via RF communicator 230, an RF signal that includes a connection command requesting that the communicating state be reestablished (step S409).

Main body device 100 executes a process in accordance with the key included in the received IR signal.

Meanwhile, in response to receiving the RF signal that includes the connection command, main body device 100 reestablishes a connection with operation device 200 to enter the communicating state and starts transmitting a POLL signal again.

Next, main body device 100 determines whether the communicating state of being in communication with communication device 300 is established (step S410).

Next, main body device 100 transmits a first command if main body device 100 determines that the communicating state of being in communication with communication device 300 is established, or transmits a second command if main body device 100 determines that the communicating state of being in communication with communication device 300 is not established (step S411).

Next, operation device 200 selects a communication scheme in accordance with the command that operation device 200 has received from main body device 100 (step S412), and in response to receiving an input of a key from the user, operation device 200 transmits a signal that includes the received key to main body device 100 in the determined communication scheme.

[1-3. Advantageous Effects and Others]

As described above, according to Embodiment 1, main body device 100 is a main body device that communicates wirelessly with operation device 200 and communication device 300. Operation device 200 is capable of transmitting and receiving a signal (an RF signal, according to the present embodiment) in a first communication scheme (Bluetooth (registered trademark), according to the present embodiment) and is also capable of transmitting a signal (an IR signal, according to the present embodiment) in a second communication scheme (a communication scheme in which IR light is used, according to the present embodiment) different from the first communication scheme. Communication device 300 is capable of transmitting and receiving a signal in the first communication scheme. Main body device 100 includes a first communicator (RF communicator 120) for transmitting or receiving a signal in the first communication scheme, a second communicator (IR communicator 110) for transmitting a signal in the second communication scheme, and controller 140 that executes a process in accordance with an operation signal transmitted by operation device 200 and received via the first communicator or the second communicator. Controller 140 determines whether controller 140 can determine the timing of transmitting or receiving a signal to or from communication device 300 via the first communicator by communicating with communication device 300 via the first communicator. If controller 140 determines that controller 140 cannot determine such a timing, controller 140 executes a switching process that causes operation device 200 to transmit an operation signal in the second communication scheme.

Moreover, according to Embodiment 1, operation device 200 is an operation device for operating main body device 100 by transmitting, to main body device 100, an operation signal in the first communication scheme or the second communication scheme. Operation device 200 includes a first communicator (RF communicator 230) for transmitting or receiving a signal in the first communication scheme, a second communicator (IR communicator 220) for transmitting a signal in the second communication scheme, and controller 240 that transmits an operation signal to main body device 100 via the first communicator or the second communicator. Controller 240 transmits an operation signal in the second communication scheme if controller 240 determines that main body device 100 has executed a switching process that causes operation device 200 to transmit an operation signal in the second communication scheme or transmits an operation signal in the first communication scheme if controller 240 determines that main body device 100 has not executed the switching process.

In other words, in communication system 400, in a case where main body device 100 communicates wirelessly with two devices—a first device (operation device 200, according to the present embodiment) and a second device (communication device 300, according to the present embodiment), main body device 100 changes the process such that main body device 100 communicates wirelessly with the first device and the second device in different communication schemes. Herein, the first device is capable of wireless communication in two or more communication schemes that differ from each other (a communication scheme in which an IR signal is used and a communication scheme in which an RF signal is used, according to the present embodiment), and the first device becomes a slave to main body device 100. The second device is capable of wireless communication in one of the two or more communication schemes (the communication scheme in which an RF signal is used, according to the present embodiment), and the second device becomes a master to main body device 100.

According to this configuration, main body device 100 communicates wirelessly with the first device and the second device in different communication schemes, and thus no data collision occurs. In other words, with main body device 100 and operation device 200, even when main body device 100 communicates wirelessly with a device other than operation device 200 (e.g., with communication device 300), an occurrence of a data collision can be suppressed.

In addition, for example, in the switching process described above, controller 140 transmits, to operation device 200 via the first communicator, a switch signal (a first command, according to the present embodiment) that causes operation device 200 to transmit an operation signal in the second communication scheme, and thus controller 140 causes operation device 200 to transmit an operation signal in the second communication scheme.

In addition, for example, if controller 240 has received, from main body device 100 via the first communicator, a switch signal that causes operation device 200 to transmit an operation signal in the second communication scheme, controller 240 determines that main body device 100 has executed the switching process and thus transmits an operation signal in the second communication scheme.

According to this configuration, operation device 200 can select a communication scheme appropriately in accordance with the state of communication between main body device 100 and communication device 300, and thus an occurrence of a data collision in main body device 100 can be suppressed.

In addition, for example, controller 140 repeatedly transmits, to operation device 200, a POLL signal for synchronizing with operation device 200. In addition, for example, in the switching process described above, controller 140 repeatedly transmits a POLL signal to operation device 200 even after having transmitted a switch signal.

In addition, for example, controller 240 repeatedly receives, from main body device 100, a POLL signal for synchronizing with main body device 100 and repeatedly transmits, to main body device 100, an ACK responding to the received POLL signal. In addition, for example, controller 240 repeatedly transmits an ACK to main body device 100 even after having received a switch signal.

According to this configuration, without main body device 100 and operation device 200 having to perform a process of reestablishing communication therebetween, operation device 200 can transmit a signal to main body device 100 in the first communication scheme, and main body device 100 can execute a process in accordance with the received signal.

Embodiment 2

Hereinafter, Embodiment 2 will be described with reference to FIG. 11 to FIG. 16. According to Embodiment 2, if an operation device fails to receive a POLL signal from a main body device within a predetermined time after having established wireless communication with the main body device, the operation device switches the communication scheme that the operation device uses to communicate with the main body device and stops transmitting an ACK. In this case, the main body device and the operation device enter a disconnected state from a communicating state. Moreover, according to Embodiment 2, after having entered a disconnected state from a communicating state, the main body device and the operation device return to the communicating state if the operation device has received, from the main body device, a POLL signal and an RF signal that includes a connection command. Moreover, according to Embodiment 2, the main body device refrains from transmitting an RF signal other than an RF signal that includes a connection command in the state in which communication between the main body device and the operation device is being disconnected.

Herein, configurations substantially identical to those according to Embodiment 1 are given identical reference signs, and duplicate description thereof may be omitted or simplified.

As with communication system 400, a communication system according to Embodiment 2 is a system that includes one main body device 100a (see FIG. 11), one operation device 200a (see FIG. 12), and one communication device 300.

Figure 11:
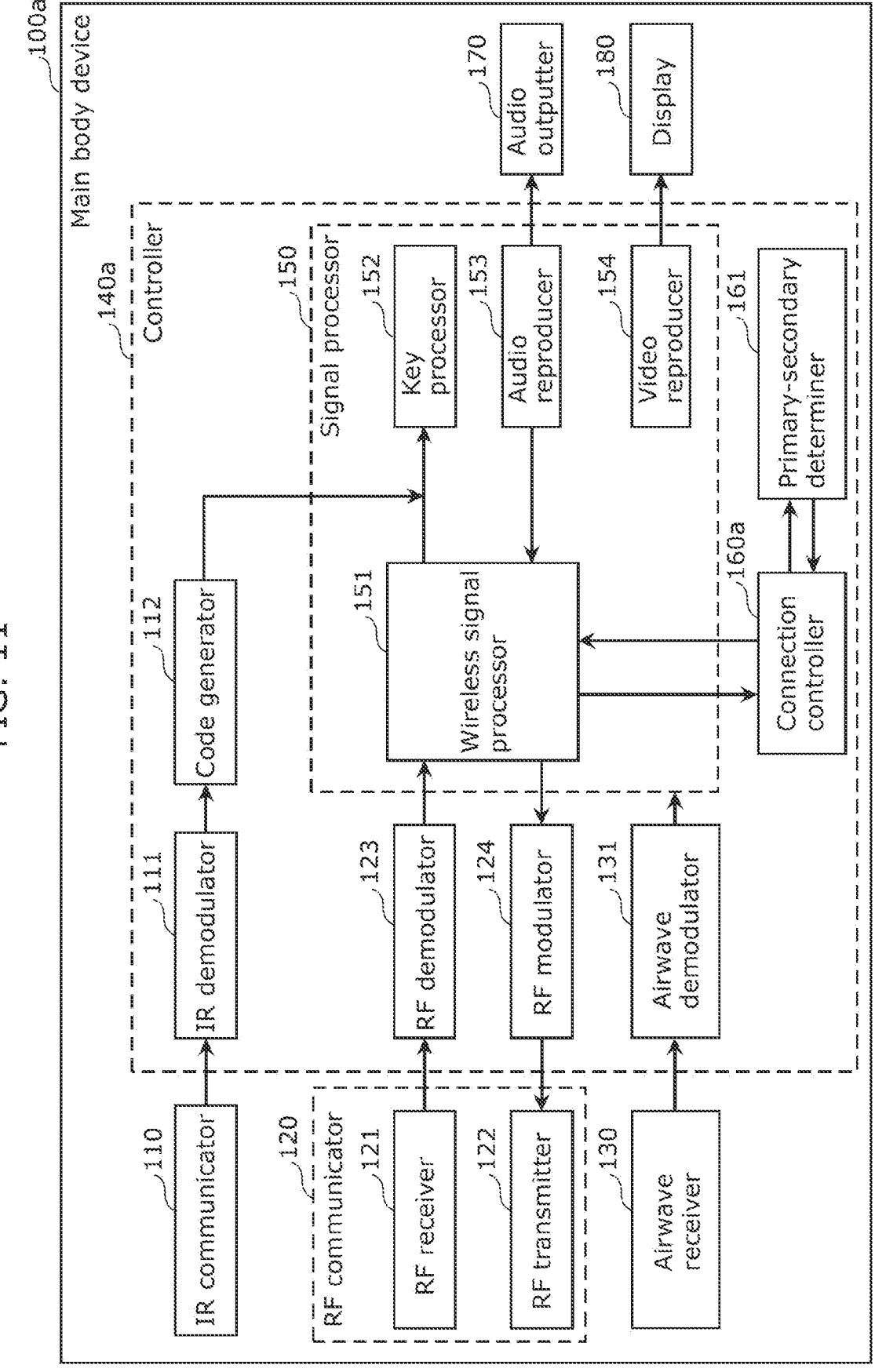
FIG. 11 is a block diagram illustrating a configuration of a main body device according to Embodiment 2.

[2-1. Configuration]
<Main Body Device>
FIG. 11 is a block diagram illustrating a configuration of main body device 100a according to Embodiment 2.

Main body device 100a includes IR communicator 110, RF communicator 120, airwave receiver 130, controller 140a, audio outputter 170, and display 180.

Controller 140a is a processor that executes various processes. Controller 140a communicates with communication device 300 via RF communicator 120 to determine whether controller 140a can determine the timing of transmitting or receiving a signal to or from communication device 300 via RF communicator 120. If controller 140a determines that controller 140 cannot determine such a timing, controller 140a executes a switching process that causes operation device 200a to transmit an operation signal in a communication scheme in which IR light is used. According to the present embodiment, after controller 140a has executed pairing to operation device 200a, controller 140a repeatedly transmits, to operation device 200a, a POLL signal for synchronizing with operation device 200a, and thus controller 140a maintains the state of being in communication with operation device 200a. In this example, in the switching process described above, controller 140a causes operation device 200a to transmit an operation signal in the communication scheme in which IR light is used, by stopping transmitting a POLL signal. Moreover, according to the present embodiment, since main body device 100a has stopped transmitting a POLL signal as the switching process, main body device 100a and operation device 200a enter a disconnected state.

Controller 140a includes, function-wise, IR demodulator 111, code generator 112, RF demodulator 123, RF modulator 124, airwave demodulator 131, signal processor 150, connection controller 160a, and primary-secondary determiner 161. Respective processes executed by IR demodulator 111, code generator 112, RF demodulator 123, RF modulator 124, airwave demodulator 131, signal processor 150, connection controller 160a, and primary-secondary determiner 161 are implemented as a CPU executes control programs stored in a memory or the like.

Connection controller 160a changes the connection state of wireless communication between main body device 100a and operation device 200a and between main body device 100a and communication device 300.

Meanwhile, connection controller 160a communicates with communication device 300 via RF communicator 120 to determine whether connection controller 160a can determine the timing of transmitting or receiving a signal to or from communication device 300 via RF communicator 120. If connection controller 160a determines that connection controller 160a cannot determine such a timing, connection controller 160a executes a switching process that causes operation device 200a to transmit an operation signal in the communication scheme in which IR light is used. According to the present embodiment, connection controller 160a repeatedly transmits, to operation device 200a, a POLL signal for synchronizing with operation device 200a after having executed pairing to operation device 200a, and in the switching process described above, connection controller 160a causes operation device 200a to transmit an operation signal in the communication scheme in which IR light is used, by stopping transmitting a POLL signal.

Figure 12:
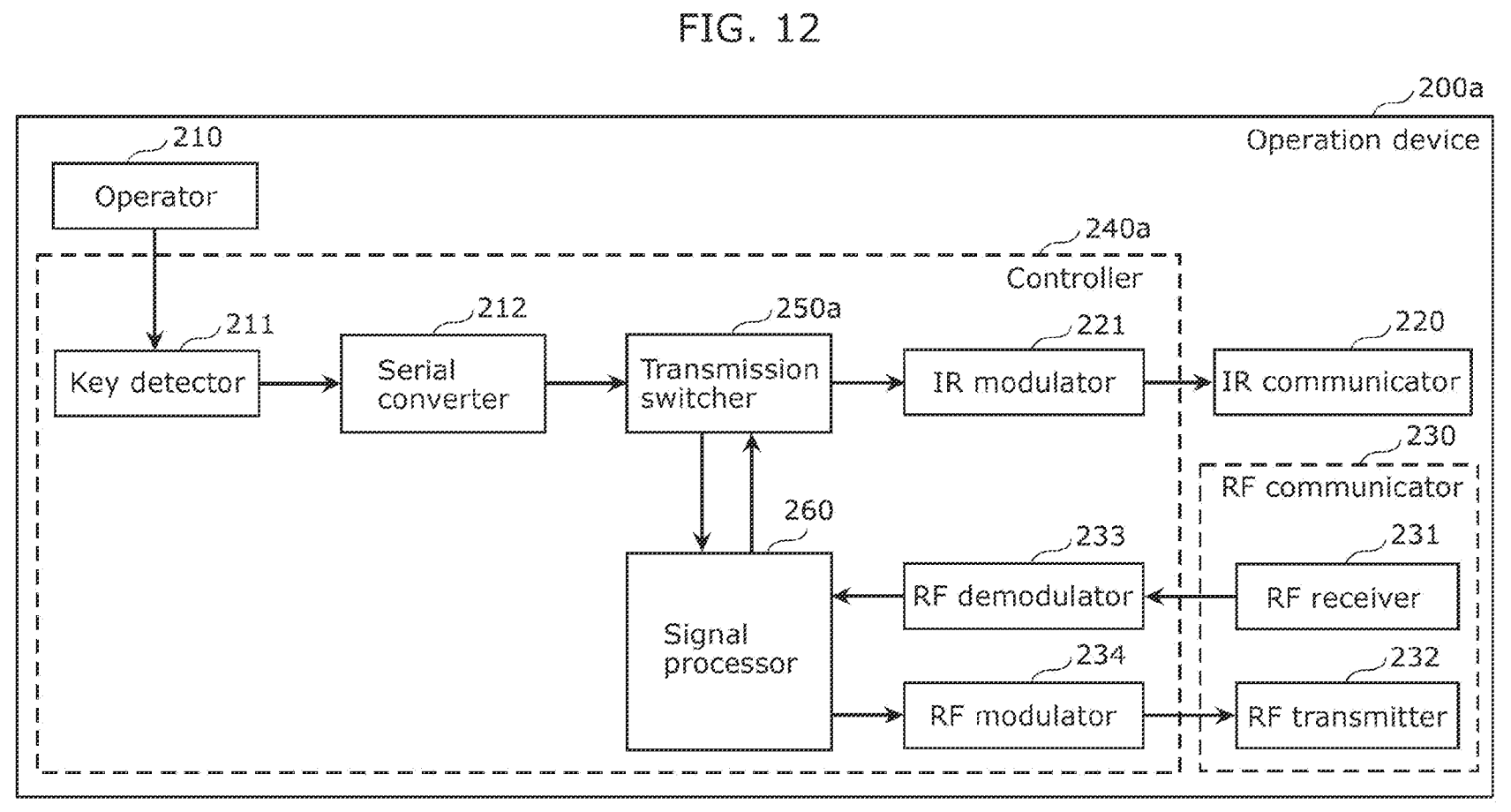

<Operation Device>
FIG. 12 is a block diagram illustrating a configuration of operation device 200a according to Embodiment 2.

Operation device 200a includes operator 210, IR communicator 220, RF communicator 230, and controller 240a.

Controller 240a is a processor that executes various processes. For example, controller 240a transmits a signal (an operation signal) to main body device 100a via IR communicator 220 or RF communicator 230.

Moreover, if controller 240a determines that main body device 100a has executed the switching process that causes operation device 200a to transmit an operation signal in the communication scheme in which IR light is used (if controller 240a fails to receive a POLL signal within a predetermined time, according to the present embodiment), controller 240a transmits an operation signal in the communication scheme in which IR light is used. Meanwhile, if controller 240a determines that main body device 100a has not executed the switching process (if controller 240a repeatedly receives a POLL signal at regular intervals, according to the present embodiment), controller 240a transmits an operation signal in the communication scheme in which IR light is used. In other words, controller 240a transmits an operation signal in an IR signal if main body device 100a has executed the switching process described above or transmits an operation signal in an RF signal if main body device 100a has not executed the switching process described above.

According to the present embodiment, controller 240a repeatedly receives, from main body device 100a, a POLL signal for synchronizing with main body device 100a and repeatedly transmits, to main body device 100a, an ACK serving as a response signal responding to the received POLL signal. Thus, controller 240a maintains the state of being in communication with main body device 100a. In this example, if controller 240a fails to receive a POLL signal within a predetermined time, controller 240a determines that main body device 100a has executed the switching process and thus transmits an operation signal in the communication scheme in which IR light is used. Meanwhile, if operation device 200a fails to receive a POLL signal within a predetermined time, main body device 100a and operation device 200a enter the disconnected state.

In this example, the predetermined time may be set as desired, and there is no particular limitation on the duration of the predetermined time. Operation device 200a may include a timer, such as an RTC, for measuring the time.

Controller 240a includes, function-wise, key detector 211, serial converter 212, transmission switcher 250a, signal processor 260, IR modulator 221, RF modulator 234, and RF demodulator 233. Respective processes executed by key detector 211, serial converter 212, transmission switcher 250a, signal processor 260, IR modulator 221, RF modulator 234, and RF demodulator 233 are implemented as a CPU executes control programs stored in a memory or the like.

Transmission switcher 250a makes a switch as to whether to transmit information expressed in a serial code generated by serial converter 212 via IR communicator 220 or RF communicator 230.

Specifically, if transmission switcher 250a determines that main body device 100a has executed the switching process that causes operation device 200a to transmit an operation signal in the communication scheme in which IR light is used, transmission switcher 250a transmits an operation signal in the communication scheme in which IR light is used. Meanwhile, if transmission switcher 250a determines that main body device 100a has not executed the switching process, transmission switcher 250a transmits an operation signal in Bluetooth (registered trademark). According to the present embodiment, transmission switcher 250a repeatedly receives, from main body device 100a, a POLL signal for synchronizing with main body device 100a and repeatedly transmits, to main body device 100a, an ACK serving as a response signal responding to the received POLL signal. If transmission switcher 250a fails to receive a POLL signal within a predetermined time, transmission switcher 250a determines that main body device 100a has executed the switching process and thus transmits an operation signal in the communication scheme in which IR light is used.

[2-2. Operation]

Now, an operation of main body device 100a and of operation device 200a configured as described above will be described. Herein, steps similar to those according to Embodiment 1 are given similar reference signs, and description thereof may be omitted or simplified.

<Main Body Device>

Figure 13:
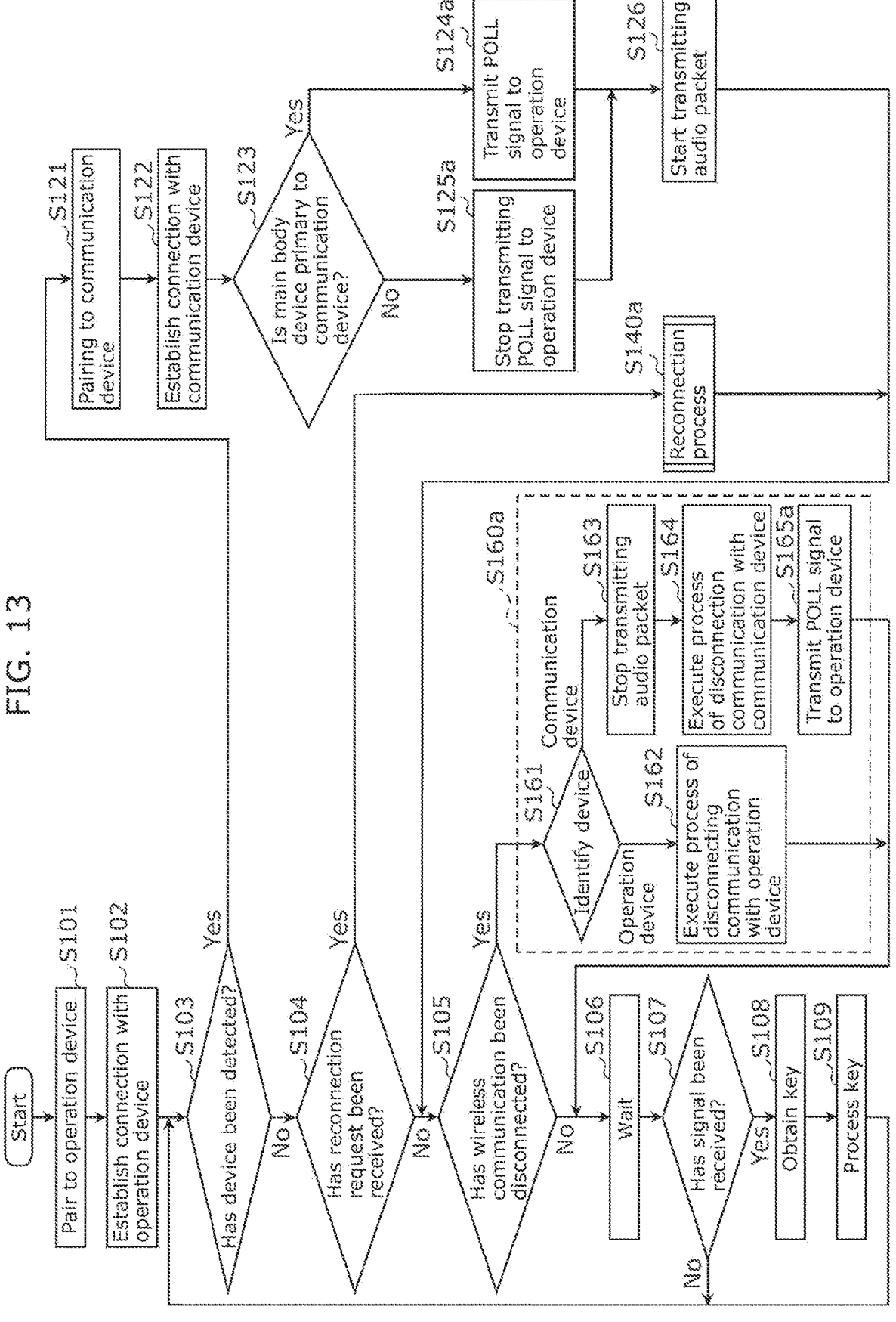
FIG. 13 is a flowchart illustrating processing procedures of the main body device according to Embodiment 2.

FIG. 13 is a flowchart illustrating processing procedures of main body device 100a according to Embodiment 2.

First, controller 140a starts a pairing process of pairing to operation device 200a (step S101).

Next, controller 140a enters a communicating state in which a connection is established that allows controller 140a to communicate wirelessly with operation device 200a via RF communicator 120 (step S102). If the state has been switched from a disconnected state to the communicating state, controller 140a transmits a POLL signal to operation device 200a at regular intervals.

Next, controller 140a determines whether controller 140a has detected a device with which controller 140a can communicate wirelessly (step S103).

If controller 140a has detected a device with which controller 140a can communicate wirelessly (Yes at step S103), controller 140a executes pairing to this device (step S121). The processes following step S121 will be described later.

Meanwhile, if controller 140a fails to detect a device with which controller 140a can communicate wirelessly (No at step S103), controller 140a determines whether any device for which a pairing process has already been executed and that has been out of a communicating state has reconnected to controller 140a. In other words, controller 140a determines whether controller 140a has been requested to reenter a communicating state with such a device (step S104).

If controller 140a has been reconnected by a device for which a pairing process has already been executed and that has been out of a communicating state (Yes at step S104), controller 140a executes a reconnection process (step S140a).

In the reconnection process (step S140a), as with the reconnection process (step S140) illustrated in FIG. 6, controller 140a determines whether the reconnected device is operation device 200a or communication device 300 (step S141).

If controller 140a has received a signal requesting a reconnection from communication device 300 ("Communication device" at step S141), controller 140a executes processes similar to the processes at step S122 to step S126 indicated of FIG. 13.

Meanwhile, if controller 140a has received a signal requesting a reconnection from operation device 200a ("Operation device" at step S141), controller 140a establishes a communication connection with operation device 200a to enter the communicating state from the disconnected state (step S142) and executes processes similar to the processes at step S123 to step S125a of FIG. 13.

Meanwhile, if controller 140a is not reconnected by any device for which a pairing process has already been executed and that has been out of a communicating state (No at step S104), controller 140a determines whether wireless communication with a device for which a pairing process has already been executed and that is in a communicating state has been disconnected (step S105).

If controller 140a determines that wireless communication with the device that is in the communicating state has been disconnected (Yes at step S105), controller 140a executes a disconnecting process (step S160a).

The details of the disconnecting process (step S160a) will be described later.

Meanwhile, if controller 140a determines that wireless communication with the device that is in the communicating state has not been disconnected (No at step S105), controller 140a waits until controller 140a receives a signal (a packet) from this device or until a predetermined time passes (step S106).

At this point, if controller 140a has received a signal (a packet) from the device that is in the communicating state (e.g., operation device 200a) (Yes at step S107), controller 140a decrypts the packet (e.g., obtains information (a key) included in the signal by demodulating the signal), executes a process in accordance with an instruction indicated by the key (step S109), and returns the process to step S103.

Meanwhile, if controller 140a fails to receive a signal (a packet) from the device that is in the communicating state (e.g., operation device 200a) within a predetermined time (No at step S107), controller 140a returns the process to step S103.

As described above, if controller 140a detects, for example, communication device 300 at step S121, controller 140a executes a pairing process of pairing to communication device 300.

Next, main body device 100a and communication device 300 establish a connection for communication therebetween so that main body device 100a and communication device 300 enter a communicating state of being capable of communicating with each other wirelessly with use of an RF signal (step S122). If the state has been switched from a disconnected state to the communicating state, communication device 300 transmits a POLL signal to main body device 100a at regular intervals, and main body device 100a transmits, to communication device 300, an ACK responding to the received POLL signal.

Next, primary-secondary determiner 161 determines whether main body device 100a is primary and communication device 300 is secondary (step S123).

If primary-secondary determiner 161 determines that main body device 100a is primary (Yes at step S123), controller 140a repeatedly transmits a POLL signal to operation device 200a via RF communicator 120 (step S124a).

Meanwhile, if primary-secondary determiner 161 determines that main body device 100a is secondary (No at step S123), controller 140a stops transmitting a POLL signal to operation device 200a via RF communicator 120 (step S125a). With this operation, main body device 100a and operation device 200a enter the disconnected state.

In this manner, controller 140a executes a switching process by executing step S124a or step S125a.

Next, after having executed step S124a or step S125a, controller 140a, for example, starts transmitting, to communication device 300 via RF communicator 120, an audio packet of audio processed by audio reproducer 153 and output by audio outputter 170 (step S126) and moves the process to step S105.

In the disconnecting process (step S160a), controller 140a determines whether the device with which communication has been disconnected is operation device 200a or communication device 300 (step S161).

If controller 140a determines that the device with which communication has been disconnected is operation device 200a ("Operation device" at step S161), controller 140a executes a disconnecting process of disconnecting communication with operation device 200a (step S162). For example, controller 140a stops transmitting a POLL signal to operation device 200a via RF communicator 120. With this operation, main body device 100a and operation device 200a enter the disconnected state.

Meanwhile, if controller 140a determines that the device with which communication has been disconnected is communication device 300 ("Communication device" at step S161), controller 140a stops transmitting an RF signal indicating an audio packet to communication device 300 via RF communicator 120 (step S163).

Next, controller 140a executes a disconnecting process of disconnecting communication with communication device 300 (step S164). With this operation, main body device 100a and communication device 300 enter the disconnected state.

Next, if controller 140a is in a state of being disconnected from operation device 200a, controller 140a transmits a connection command to operation device 200a via RF communicator 120 and starts transmitting a POLL signal (step S165a). In other words, if main body device 100a is not to communicate wirelessly with communication device 300, main body device 100a transmits a connection command to operation device 200a and starts transmitting a POLL signal to operation device 200a. Thus, main body device 100a enters a state of being in communication with operation device 200a and causes operation device 200a to transmit an RF signal when operation device 200a transmits a key packet.

<Operation Device>

Figure 14:
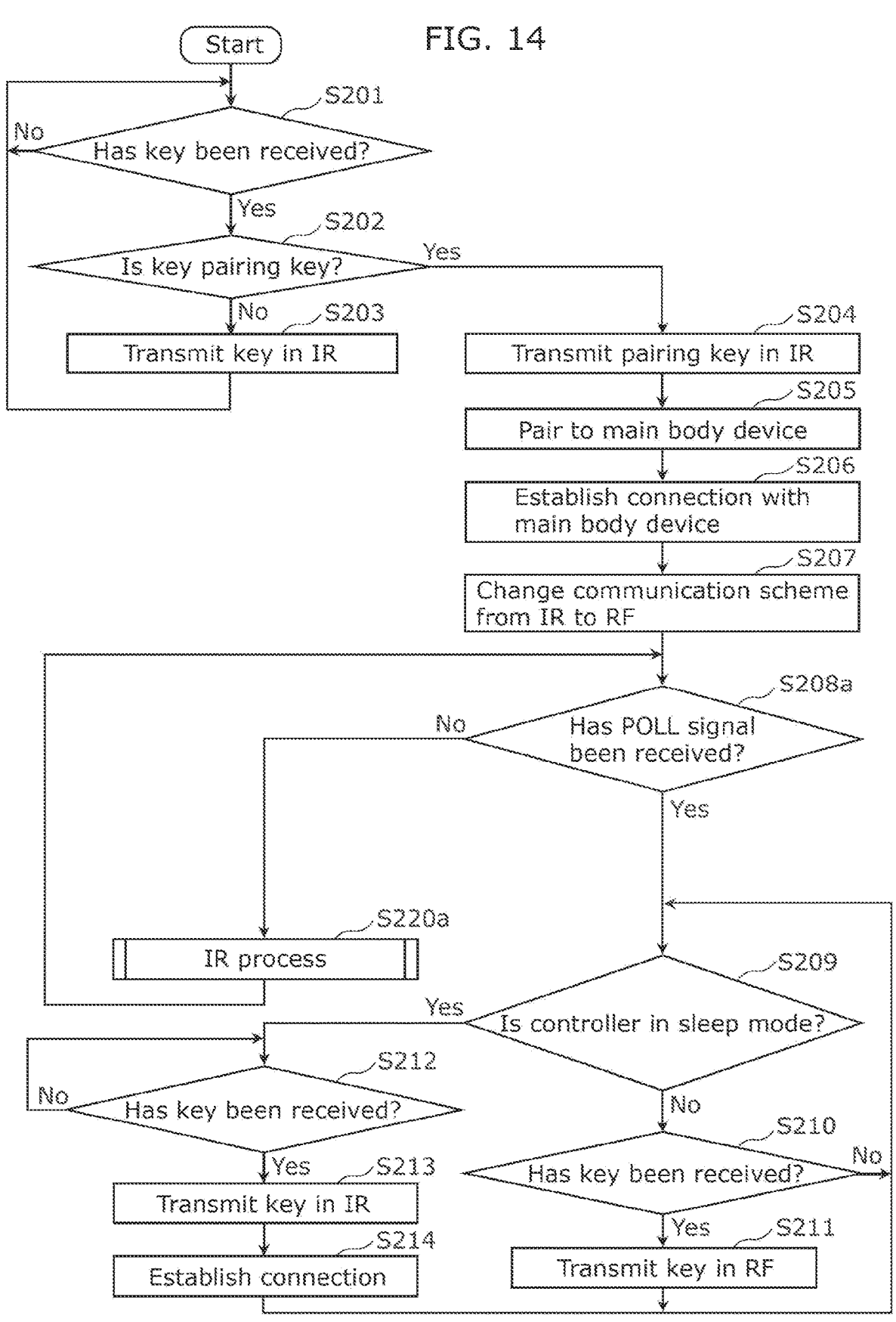
FIG. 14 is a flowchart illustrating processing procedures of the operation device according to Embodiment 2.

FIG. 14 is a flowchart illustrating processing procedures of operation device 200a according to Embodiment 2.

In the flowchart illustrated in FIG. 14, initially, main body device 100a and operation device 200a are in a state in which they have not established a connection for wireless communication in which an RF signal is used.

First, controller 240a determines whether operator 210 has received an instruction from the user. In other words, controller 240a determines whether operator 210 has received an input of a key (step S201).

If operator 210 has not received any input of a key (No at step S201), controller 240a repeats the process of step S201.

Meanwhile, if operator 210 has received an input of a key (Yes at step S201), controller 240a determines whether the received key is a pairing key instructing controller 240a to execute a pairing process of pairing to main body device 100a (step S202).

If controller 240a determines that the received key is not a pairing key (No at step S202), controller 240a transmits an IR signal indicating this key via IR communicator 220 (step S203) and returns the process to step S201.

Meanwhile, if controller 240a determines that the received key is a pairing key (Yes at step S202), controller 240a transmits an IR signal indicating the pairing key via IR communicator 220 (step S204).

Next, controller 240a executes pairing to main body device 100a (step S205).

Next, controller 240a establishes a connection for communication with main body device 100a and thus enters the communicating state of being in communication with main body device 100a (step S206). If the state has been switched from a disconnected state to the communicating state, controller 240a transmits, to main body device 100, an ACK responding to a POLL signal transmitted from main body device 100 at regular intervals.

Moreover, controller 240a switches the signal that controller 240a uses to transmit, to main body device 100a, a signal that includes a key in response to operator 210 receiving an input of a key from an IR signal to an RF signal (step S207).

Next, controller 240*a* determines whether controller 240 has received a POLL signal via RF communicator 230 (step S208*a*). In other words, controller 240*a* determines whether controller 240*a* continues to receive a POLL signal repeatedly from main body device 100*a*.

If, for example, controller 240*a* fails to receive a POLL signal within a predetermined time after having received a POLL signal last time (No at step S208*a*), controller 240*a* executes an IR process (step S220*a*) and returns the process to step S208*a*. Step S220*a* will be described later.

Meanwhile, if controller 240*a* has received a POLL signal before a predetermined time passes after having received a POLL signal last time (Yes at step S208*a*), controller 240*a* determines whether controller 240*a* is currently in a sleep mode or is to enter a sleep mode later on (step S209).

If controller 240*a* is neither currently in a sleep mode nor to enter a sleep mode later on (No at step S209), and if controller 240*a* has received an input of a key (Yes at step S210), controller 240*a* transmits an RF signal indicating the received key to main body device 100*a* via RF communicator 230 (step S211).

Meanwhile, if controller 240*a* is neither currently in a sleep mode nor to enter a sleep mode later on (No at step S209), and if controller 240*a* has not received any input of a key (No at step S210), controller 240*a* returns the process to step S209.

Meanwhile, if controller 240*a* is currently in a sleep mode or is to enter a sleep mode later on (Yes at step S209), controller 240*a* determines whether operator 210 has received an input of a key (step S212).

If operator 210 has not received any input of a key (No at step S212), controller 240*a* remains in a sleep mode (or enters a sleep mode) and continues with the determination at step S212.

Meanwhile, if operator 210 has received an input of a key (Yes at step S212), controller 240*a* resumes from the sleep mode to return to a normal mode and transmits an IR signal indicating the received key (step S213).

Next, controller 240*a* transmits an RF signal that includes a connection command via RF communicator 230 to reestablish a connection for communication with main body device 100*a*, and thus controller 240*a* enters, from the disconnected state, the communicating state of being in communication with main body device 100*a* (step S214). If the state has been switched from the disconnected state to the communicating state, controller 240*a* transmits, to main body device 100*a*, an ACK responding to a POLL signal transmitted from main body device 100*a* at regular intervals.

FIG. 15 is a flowchart illustrating an IR process that operation device 200*a* according to Embodiment 2 executes. Specifically, FIG. 15 is a flowchart illustrating the details of step S220*a* of FIG. 14.

If controller 240*a* fails to receive a POLL signal via RF communicator 230 before a predetermined time passes after having received a POLL signal last time (No at step S208*a* of FIG. 14), controller 240*a* switches the signal that controller 240*a* transmits from an RF signal to an IR signal and enters the disconnected state from the communicating state (step S221).

Next, controller 240*a* determines whether controller 240*a* has received a POLL signal and an RF signal that includes a connection command via RF communicator 230 (step S222*a*).

If controller 240*a* has received a POLL signal and an RF signal that includes a connection command (Yes at step S222*a*), controller 240*a* switches the signal controller 240*a* transmits from an IR signal to an RF signal and enters a communicating state of being in communication with main body device 100*a* (step S230).

Meanwhile, if controller 240*a* fails to receive a POLL signal and an RF signal that includes a connection command (No at step S222*a*), controller 240*a* determines whether controller 240*a* is currently in a sleep mode or is to enter a sleep mode later on (step S223).

If controller 240*a* is currently in a sleep mode or is to enter a sleep mode later on (Yes at step S223), controller 240*a* executes the processes at step S212 to step S214 of FIG. 14 and returns the process to step S222*a*.

Meanwhile, if controller 240*a* is neither currently in a sleep mode nor to enter a sleep mode later on (No at step S223), controller 240*a* determines whether operator 210 has received an input of a key (step S224).

If operator 210 has received an input of a key (Yes at step S224), controller 240*a* transmits an IR signal indicating the received key (step S225).

Meanwhile, if operator 210 has not received any input of a key (No at step S224), controller 240*a* returns the process to step S222*a*.

<Switching Process>

Figure 16:
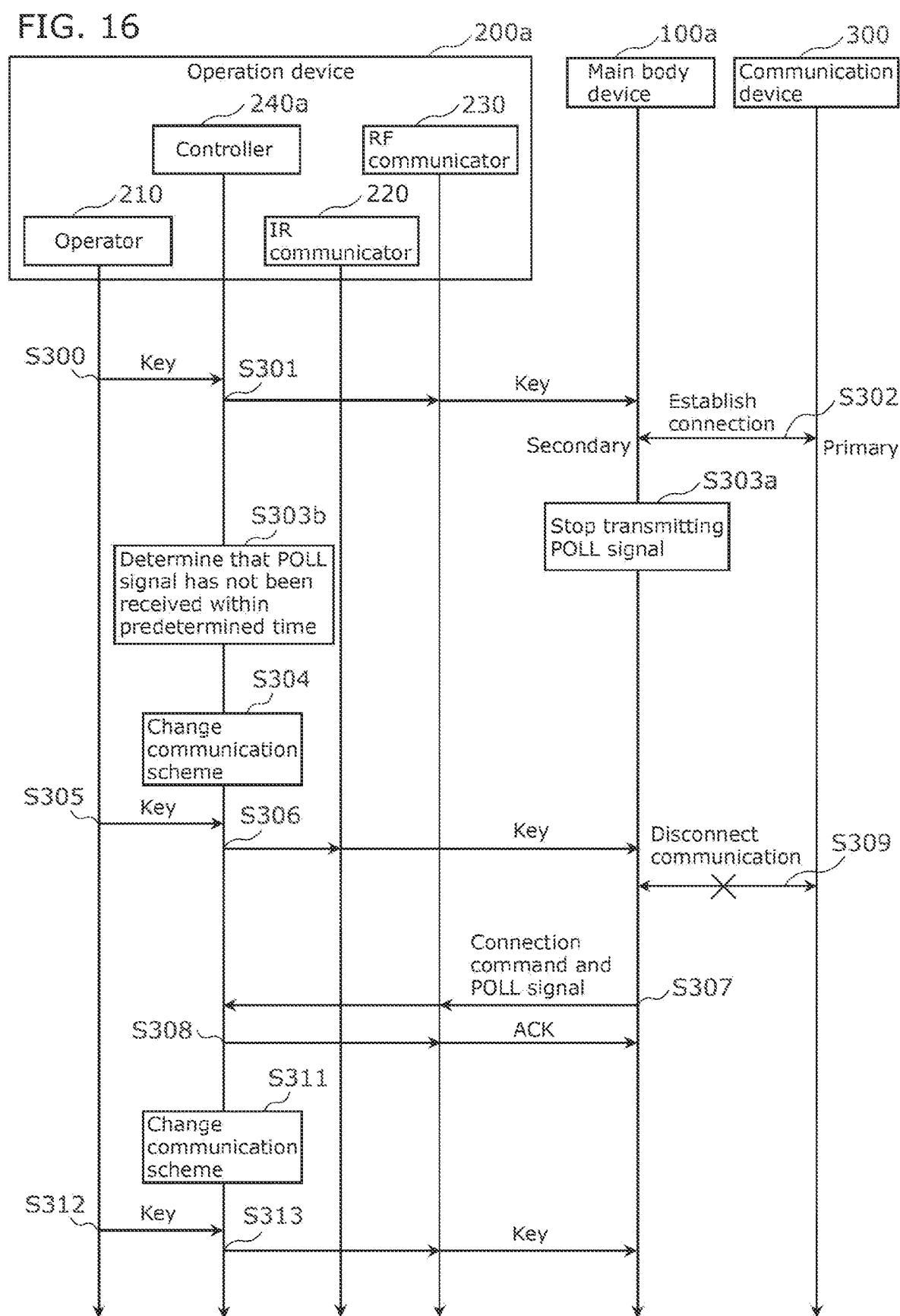
FIG. 16 is a sequence diagram illustrating processing procedures of a switching process performed in a communication system according to Embodiment 2.

FIG. 16 is a sequence diagram illustrating processing procedures of a switching process performed in the communication system according to Embodiment 2.

In the sequence diagram illustrated in FIG. 16, initially, communication is established between main body device 100*a* and operation device 200*a*, but no communication is established between main body device 100*a* and communication device 300.

For example, operator 210 receives an input (a key input) from the user (step S300).

Next, controller 240*a* transmits an RF signal that includes the key received by operator 210 to main body device 100*a* via RF communicator 230 (step S301). Main body device 100*a* executes a process in accordance with the key included in the received RF signal.

At this point, main body device 100*a* establishes a connection for communication such that, for example, main body device 100*a* is a slave and communication device 300 is a master (step S302).

In this case, after step S302, as the switching process described above, main body device 100*a* stops transmitting a POLL signal to operation device 200*a* in order to cause operation device 200*a* to transmit a signal in an IR signal (step S303*a*).

In response to controller 240*a* determining that controller 240*a* has not received a POLL signal within a predetermined time from main body device 100*a* via RF communicator 230 (step S303*b*), controller 240*a* enters a disconnected state and changes the communication scheme such that, when controller 240*a* transmits a signal that includes a key to main body device 100*a*, controller 240*a* transmits the signal in an IR signal (step S304).

With this operation, in response to operator 210 receiving an input (a key input) from the user after step S304 (step S305), controller 240*a* transmits an IR signal that includes the key that operator 210 has received to main body device 100*a* via IR communicator 220 (step S306).

In this example, the communication between main body device 100*a* and communication device 300 becomes disconnected after step S303*a* (step S309).

In this case, as the switching process described above, in order to cause operation device 200*a* to transmit a signal in an RF signal, main body device 100*a* performs a reconnection process for entering a state of being in communication with operation device 200*a* again by transmitting, to operation device 200*a*, an RF signal that includes a connection command, and starts transmitting a POLL signal to operation device 200*a* again (step S307).

In response to controller 240*a* receiving a POLL signal and an RF signal that includes a connection command from main body device 100*a* via RF communicator 230 after step S304, controller 240*a* transmits an ACK to main body device 100*a* (step S308). In this manner, as main body device 100*a* executes step S307, main body device 100*a* and operation device 200*a* shift to the communicating state from the disconnected state. Controller 240 changes the communication scheme such that, when operation device 200*a* transmits a signal that includes a key to main body device 100*a*, operation device 200*a* transmits the signal in an RF signal (step S311).

With this operation, in response to operator 210 receiving an input (a key input) from the user after step S311 (step S312), controller 240*a* transmits an RF signal that includes the key that operator 210 has received to main body device 100*a* via RF communicator 230 (step S313).

[2-3. Advantageous Effects and Others]

As described above, according to Embodiment 2, controller 140*a* of main body device 100*a* repeatedly transmits a POLL signal for synchronizing with operation device 200*a* to the operation device via a first communicator. In addition, in the switching process, controller 140*a* causes operation device 200*a* to transmit an operation signal in a second communication scheme, by stopping transmitting a POLL signal.

In addition, according to Embodiment 2, controller 240*a* of operation device 200*a* repeatedly receives a POLL signal for synchronizing with main body device 100*a* from main body device 100*a* via a first communicator, and if controller 240*a* fails to receive a POLL signal within a predetermined time, controller 240*a* determines that main body device 100*a* has executed the switching process and transmits an operation signal in the second communication scheme.

According to this configuration, main body device 100*a* can cause operation device 200*a* to switch the communication scheme without transmitting any signal that causes operation device 200*a* to switch the communication scheme. Accordingly, with main body device 100*a* and operation device 200*a*, even when main body device 100*a* communicates wirelessly with a device other than operation device 200*a* (e.g., with communication device 300), an occurrence of a data collision can be suppressed through simple processing procedures.

Embodiment 3

Hereinafter, Embodiment 3 will be described with reference to FIG. 17 to FIG. 22. According to Embodiment 3, after having established wireless communication with a main body device, an operation device switches the communication scheme that the operation device uses to communicate with the main body device, in response to receiving an RF signal that includes a switch signal (a disconnect command) from the main body device. In this case, unlike Embodiment 1, the main body device and the operation device enter a disconnected state. Moreover, according to Embodiment 3, after having entered the disconnected state from a communicating state, the main body device and the operation device return to the communicating state if the operation device has received, from the main body device, a POLL signal and an RF signal that includes a connection command. Moreover, according to Embodiment 3, the main body device refrains from transmitting any RF signal other than an RF signal that includes a connection command in the state in which communication between the main body device and the operation device is disconnected.

Herein, configurations substantially identical to those according to Embodiment 1 or Embodiment 2 are given identical reference signs, and duplicate description thereof may be omitted or simplified.

As with communication system 400, a communication system according to Embodiment 3 is a system that includes one main body device 100*b* (see FIG. 17), one operation device 200*b* (see FIG. 18), and one communication device 300.

[3-1. Configuration]

<Main Body Device>

Figure 17:
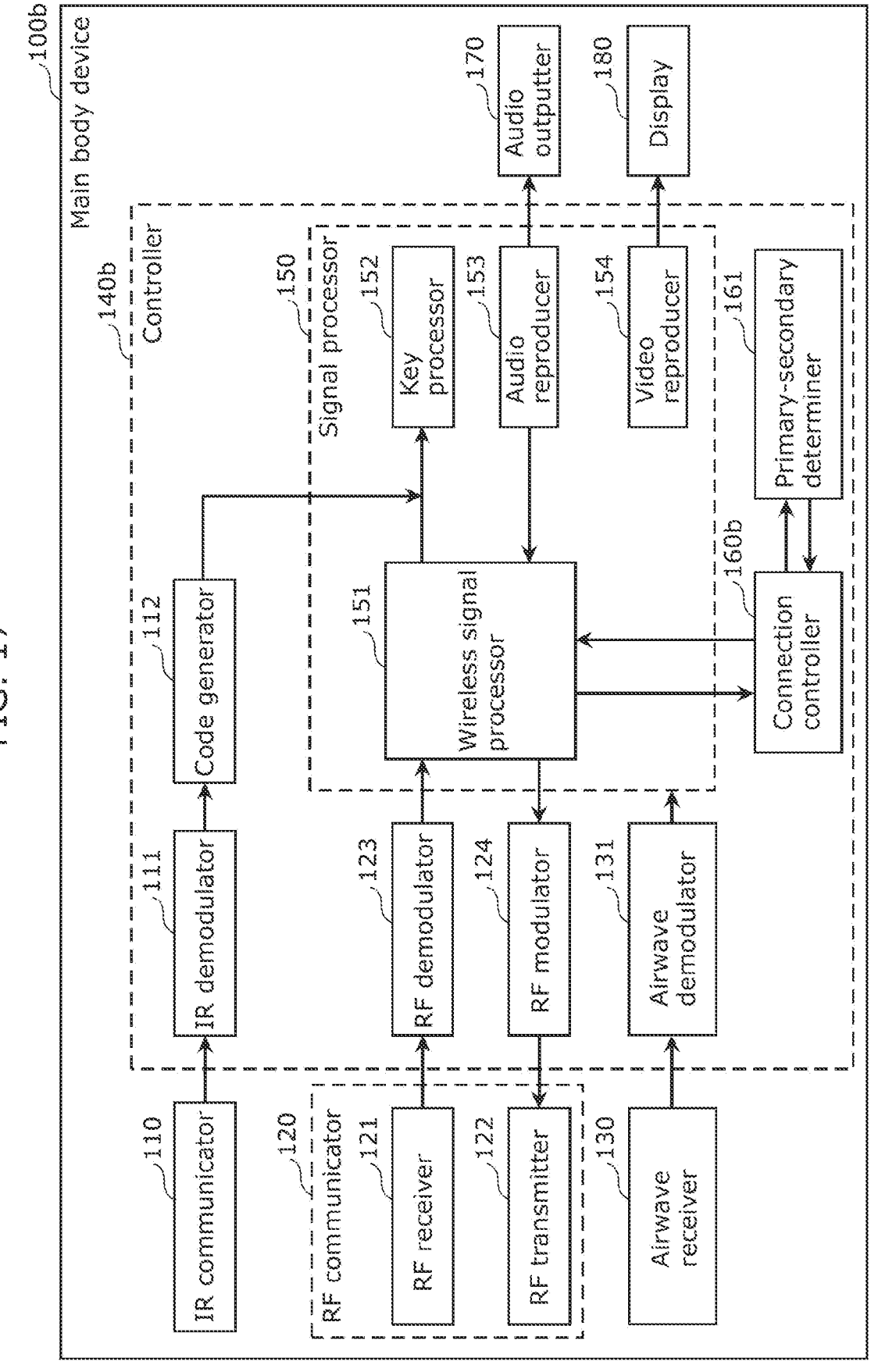
FIG. 17 is a block diagram illustrating a configuration of a main body device according to Embodiment 3.

FIG. 17 is a block diagram illustrating a configuration of main body device 100*b* according to Embodiment 3.

Main body device 100*b* includes IR communicator 110, RF communicator 120, airwave receiver 130, controller 140*b*, audio outputter 170, and display 180.

Controller 140*b* is a processor that executes various processes. Controller 140*b* communicates with communication device 300 via RF communicator 120 to determine whether controller 140*b* can determine the timing of transmitting or receiving a signal to or from communication device 300 via RF communicator 120. If controller 140*b* determines that controller 140*b* cannot determine such a timing, controller 140*b* executes a switching process that causes operation device 200*b* to transmit an operation signal in a communication scheme in which IR light is used. According to the present embodiment, in the switching process described above, controller 140*b* causes operation device 200*b* to transmit an operation signal in the communication scheme in which IR light is used, by transmitting, to operation device 200*b* via RF communicator 120, a switch signal (a disconnect command (described later), according to the present embodiment) that causes operation device 200*b* to transmit an operation signal in the communication scheme in which IR light is used.

Meanwhile, after controller 140*b* has executed pairing to operation device 200*b*, controller 140*b* repeatedly transmits, to operation device 200*b*, a POLL signal for synchronizing with operation device 200*b*, and thus controller 140*b* maintains the state of being in communication with operation device 200*b*. At this point, according to the present embodiment, in the switching process described above, controller 140*b* transmits a switch signal and stops transmitting a POLL signal. In other words, controller 140*b* disconnects the communication with operation device 200*b* that has been carried out via RF communicator 120. In other words, as main body device 100*b* executes the switching process, main body device 100*b* and operation device 200*b* enter the disconnected state.

Controller 140*b* includes, function-wise, IR demodulator 111, code generator 112, RF demodulator 123, RF modulator 124, airwave demodulator 131, signal processor 150, connection controller 160*b*, and primary-secondary determiner 161. Respective processes executed by IR demodulator 111, code generator 112, RF demodulator 123, RF modulator 124, airwave demodulator 131, signal processor 150, connection controller 160*b*, and primary-secondary determiner 161 are implemented as a CPU executes control programs stored in a memory or the like.

Connection controller 160*b* changes the state of connection for wireless communication between main body device 100*b* and operation device 200*b* and between main body device 100*b* and communication device 300.

In addition, connection controller 160*b* communicates with communication device 300 via RF communicator 120 to determine whether connection controller 160*b* can determine the timing of transmitting or receiving a signal to or from communication device 300 via RF communicator 120. If connection controller 160*b* determines that connection controller 160*b* cannot determine such a timing, connection controller 160*b* executes a switching process that causes operation device 200*b* to transmit an operation signal in the communication scheme in which IR light is used. According to the present embodiment, connection controller 160*b* repeatedly transmits, to operation device 200*b*, a POLL signal for synchronizing with operation device 200*b* after having executed pairing to operation device 200*b*, and in the switching process described above, connection controller 160*b* causes operation device 200*b* to transmit an operation signal in the communication scheme in which IR light is used, by transmitting a switch signal and stopping transmitting a POLL signal.

<Operation Device>

Figure 18:
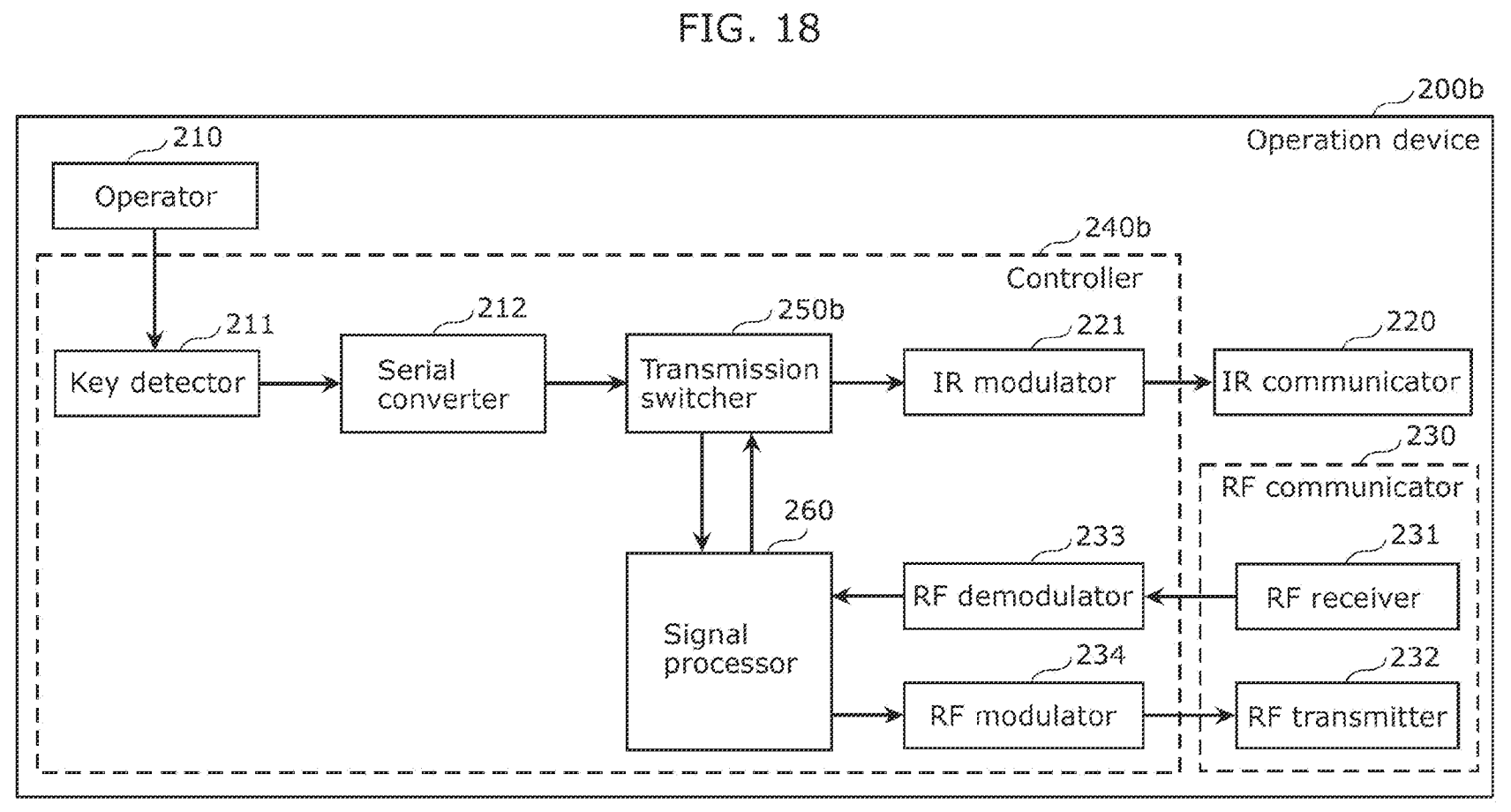

FIG. 18 is a block diagram illustrating a configuration of operation device 200*b* according to Embodiment 3.

Operation device 200*b* includes operator 210, IR communicator 220, RF communicator 230, and controller 240*b*.

Controller 240*b* is a processor that executes various processes. For example, controller 240*b* transmits a signal (an operation signal) to main body device 100*b* via IR communicator 220 or RF communicator 230.

Moreover, if controller 240*b* determines that main body device 100*b* has executed a switching process that causes operation device 200*b* to transmit an operation signal in the communication scheme in which IR light is used (according to the present embodiment, if controller 240*b* determines that a disconnect command has been received), controller 240*b* transmits an operation signal in the communication scheme in which IR light is used. Meanwhile, if controller 240*b* determines that main body device 100*b* has not executed the switching process (according to the present embodiment, if controller 240*b* determines that a connection command has been received), controller 240*b* transmits an operation signal in Bluetooth (registered trademark). In other words, controller 240*b* transmits an operation signal in an IR signal if main body device 100*b* has executed the switching process described above or transmits an operation signal in an RF signal if main body device 100*b* has not executed the switching process described above. According to the present embodiment, if controller 240*b* has received, from main body device 100*b* via RF communicator 230, a switch signal that causes controller 240*b* to transmit an operation signal in the communication scheme in which IR light is used, controller 240*b* determines that main body device 100*b* has executed the switching process. Thus, controller 240*b* transmits an operation signal in the communication scheme in which IR light is used.

In addition, for example, controller 240*b* repeatedly receives, from main body device 100*b*, a POLL signal for synchronizing with main body device 100*b* and repeatedly transmits, to main body device 100*b*, an ACK serving as a response signal responding to the received POLL signal. Thus, controller 240*b* maintains the state of being in communication with main body device 100*b*. At this point, according to the present embodiment, if controller 240*b* has received a switch signal (an RF signal that includes a disconnect command, according to the present embodiment), controller 240*b* stops transmitting an ACK to main body device 100*b*. In other words, in response to receiving a switch signal, controller 240*b* disconnects the communication with main body device 100*b* that has been carried out via RF communicator 230.

Controller 240*b* includes, function-wise, key detector 211, serial converter 212, transmission switcher 250*b*, signal processor 260, IR modulator 221, RF modulator 234, and RF demodulator 233. Respective processes executed by key detector 211, serial converter 212, transmission switcher 250*b*, signal processor 260, IR modulator 221, RF modulator 234, and RF demodulator 233 are implemented as a CPU executes control programs stored in a memory or the like.

Transmission switcher 250*b* makes a switch as to whether to transmit information expressed in a serial code generated by serial converter 212 via IR communicator 220 or RF communicator 230.

Specifically, if transmission switcher 250*b* determines that main body device 100*b* has executed the switching process that causes operation device 200*b* to transmit an operation signal in the communication scheme in which IR light is used, transmission switcher 250*b* transmits an operation signal in the communication scheme in which IR light is used. Meanwhile, if transmission switcher 250*b* determines that main body device 100*b* has not executed the switching process, transmission switcher 250*b* transmits an operation signal in Bluetooth (registered trademark). According to the present embodiment, if transmission switcher 250*b* has received, from main body device 100*b* via RF communicator 230, a switch signal that causes operation device 200*b* to transmit an operation signal in the communication scheme in which IR light is used, transmission switcher 250*b* determines that main body device 100*b* has executed the switching process. Thus, transmission switcher 250*b* transmits an operation signal in the communication scheme in which IR light is used.

In addition, for example, transmission switcher 250*b* repeatedly receives, from main body device 100*b*, a POLL signal for synchronizing with main body device 100*b*, repeatedly transmits, to main body device 100*b*, an ACK responding to the received POLL signal, and refrains from transmitting an ACK to main body device 100*b* after having received a switch signal.

[3-2. Operation]

Now, an operation of main body device 100*b* and of operation device 200*b* configured as described above will be described. Herein, steps similar to those according to Embodiment 1 or Embodiment 2 are given similar reference signs, and description thereof may be omitted or simplified.

<Main Body Device>

Figure 19:
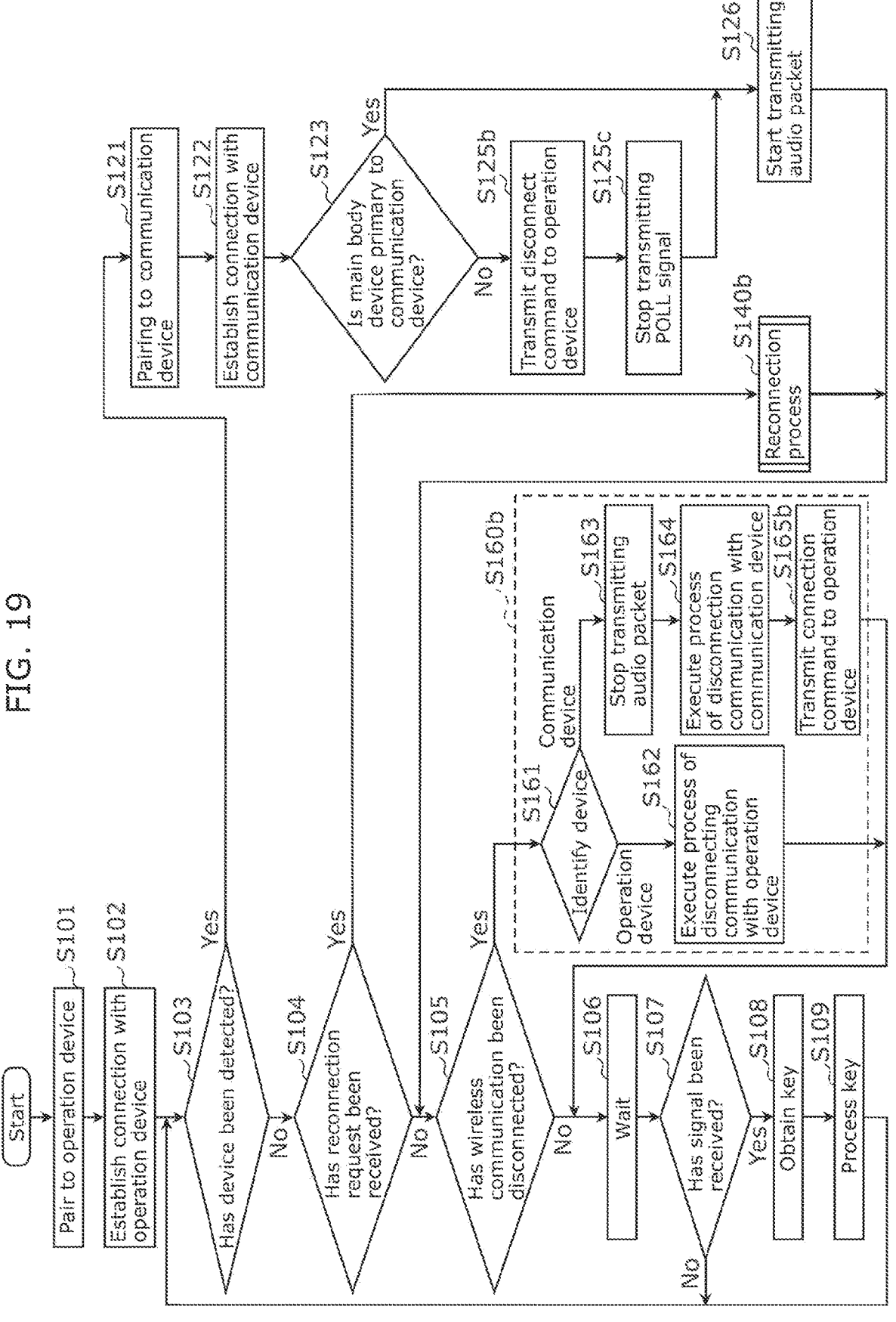
FIG. 19 is a flowchart illustrating processing procedures of the main body device according to Embodiment 3.

FIG. 19 is a flowchart illustrating processing procedures of main body device 100*b* according to Embodiment 3.

First, controller 140*b* starts a pairing process of pairing to operation device 200*b* (step S101).

Next, controller 140*b* enters a communicating state in which a connection is established that allows controller 140*b* to communicate wirelessly with operation device 200*b* via RF communicator 120 (step S102). If the state has been switched from a disconnected state to the communicating state, controller 140*b* transmits a POLL signal to operation device 200*b* at regular intervals.

Next, controller 140*b* determines whether controller 140*b* has detected a device with which controller 140*b* can communicate wirelessly (step S103).

If controller 140*b* has detected a device with which controller 140*b* can communicate wirelessly (Yes at step S103), controller 140*b* executes a pairing process of pairing to this device (step S121). The processes following step S121 will be described later.

Meanwhile, if controller 140*b* fails to detect any device with which controller 140*b* can communicate wirelessly (No at step S103), controller 140*b* determines whether a device for which a pairing process has already been executed and that has been out of a communicating state has reconnected to controller 140*b*. In other words, controller 140*b* determines whether controller 140*b* has been requested to reenter a communicating state with such a device (step S104).

If controller 140*b* has been reconnected by a device for which a pairing process has already been executed and that has been out of a communicating state (Yes at step S104), controller 140*b* executes a reconnection process (step S140*b*).

In the reconnection process (step S140*b*), as with the reconnection process (step S140) illustrated in FIG. 6, controller 140*b* determines whether the reconnected device is operation device 200*b* or communication device 300 (step S141).

If controller 140*b* has received a signal requesting a reconnection from communication device 300 ("Communication device" at step S141), controller 140*b* executes processes similar to the processes at step S122 to step S126 of FIG. 19.

Meanwhile, if controller 140*b* has received a signal requesting a reconnection from operation device 200*b* ("Operation device" at step S141), controller 140*b* establishes a connection for communication with operation device 200*b* to enter the communicating state from the disconnected state (step S142) and executes processes similar to the processes at step S123 to step S125*c* of FIG. 19.

Meanwhile, if controller 140*b* is not reconnected by any device for which a pairing process has already been executed and that has been out of a communicating state (No at step S104), controller 140*b* determines whether wireless communication with a device for which a pairing process has already been executed and that is in a communicating state has been disconnected (step S105).

If controller 140*b* determines that wireless communication with the device that is in the communicating state has been disconnected (Yes at step S105), controller 140*b* executes a disconnecting process (step S160*b*).

The details of the disconnecting process (step S160*b*) will be described later.

Meanwhile, if controller 140*b* determines that wireless communication with the device that is in the communicating state has not been disconnected (No at step S105), controller 140*b* waits until controller 140*b* receives a signal (a packet) from this device or until a predetermined time passes (step S106).

At this point, if controller 140*b* has received a signal (a packet) from the device that is in the communicating state (e.g., operation device 200*b*) (Yes at step S107), controller 140*b* decrypts the packet (e.g., obtains information (a key) included in the signal by demodulating the signal), executes a process in accordance with an instruction indicated by the key (step S109), and returns the process to step S103.

Meanwhile, if controller 140*b* fails to receive a signal (a packet) from the device that is in the communicating state (e.g., operation device 200*b*) within a predetermined time (No at step S107), controller 140*b* returns the process to step S103.

As described above, if controller 140*b* detects, for example, communication device 300 at step S121, controller 140*b* executes a pairing process of pairing to communication device 300.

Next, main body device 100*b* and communication device 300 establish a connection for communication so that main body device 100*b* and communication device 300 enter a communicating state of being capable of communicating with each other wirelessly with use of an RF signal (step S122). If the state has been switched from a disconnected state to the communicating state, communication device 300 transmits a POLL signal to main body device 100*b* at regular intervals, and main body device 100*b* transmits, to communication device 300, an ACK responding to the received POLL signal.

Next, primary-secondary determiner 161 determines whether main body device 100*b* is primary and communication device 300 is secondary (step S123).

If primary-secondary determiner 161 determines that main body device 100*b* is secondary (No at step S123), controller 140*b* transmits, to operation device 200*b* via RF communicator 120, a signal that includes a disconnect command serving as information that includes an instruction for causing operation device 200*b* to transmit an IR signal (step S125*b*). In other words, if main body device 100*b* is a slave to communication device 300, operation device 200*b* transmits, to main body device 100*b*, information (a key) received by operator 210 in the form of an IR signal.

In addition, controller 140*b* stops transmitting a POLL signal to operation device 200*b* (step S125*c*). With this operation, main body device 100*b* and operation device 200*b* enter the disconnected state from the communicating state.

Meanwhile, if controller 140*b* determines that main body device 100*b* is primary (Yes at step S123), controller 140*b* moves the process to step S126. In this case, operation device 200*b* maintains the state of being in communication with main body device 100*b* and transmits information, such as a key, to main body device 100*b* in an RF signal.

In this manner, as controller 140*b* executes step S125*b* and step S125*c* if the determination is No at step S123, controller 140*b* executes the switching process described in relation to step S24 of FIG. 4.

Next, if the determination is Yes at step S123 or after executing step S125*c*, controller 140*b* starts transmitting, to communication device 300 via RF communicator 120, an audio packet of audio processed by audio reproducer 153 and output by audio outputter 170 (step S126) and moves the process to step S105.

In the disconnecting process (step S160*b*), controller 140*b* determines whether the device with which communication has been disconnected is operation device 200*b* or communication device 300 (step S161).

If controller 140*b* determines that the device with which communication has been disconnected is operation device 200*b* ("Operation device" at step S161), controller 140*b* executes a disconnecting process of disconnecting communication with operation device 200*b* (step S162). For example, controller 140*b* stops transmitting a POLL signal to operation device 200*b* via RF communicator 120. With this operation, main body device 100*b* and operation device 200*b* enter the disconnected state from the communicating state.

Meanwhile, if controller 140*b* determines that the device with which communication has been disconnected is communication device 300 ("Communication device" at step S161), controller 140*b* stops transmitting an RF signal indicating an audio packet to communication device 300 via RF communicator 120 (step S163).

Next, controller 140*b* executes a disconnecting process of disconnecting communication with communication device 300 (step S164). For example, controller 140b stops transmitting a POLL signal to communication device 300 via RF communicator 120.

Next, if controller 140b is in a state of being disconnected from operation device 200b, controller 140b transmits a POLL signal and an RF signal indicating a connection command to operation device 200b via RF communicator 120 (step S165b). In other words, if main body device 100b is not to communicate wirelessly with communication device 300, when operation device 200b transmits a key packet, main body device 100b enters a state of being in communication with operation device 200b and causes operation device 200b to transmit a key packet in an RF signal.

<Operation Device>

Figure 20:
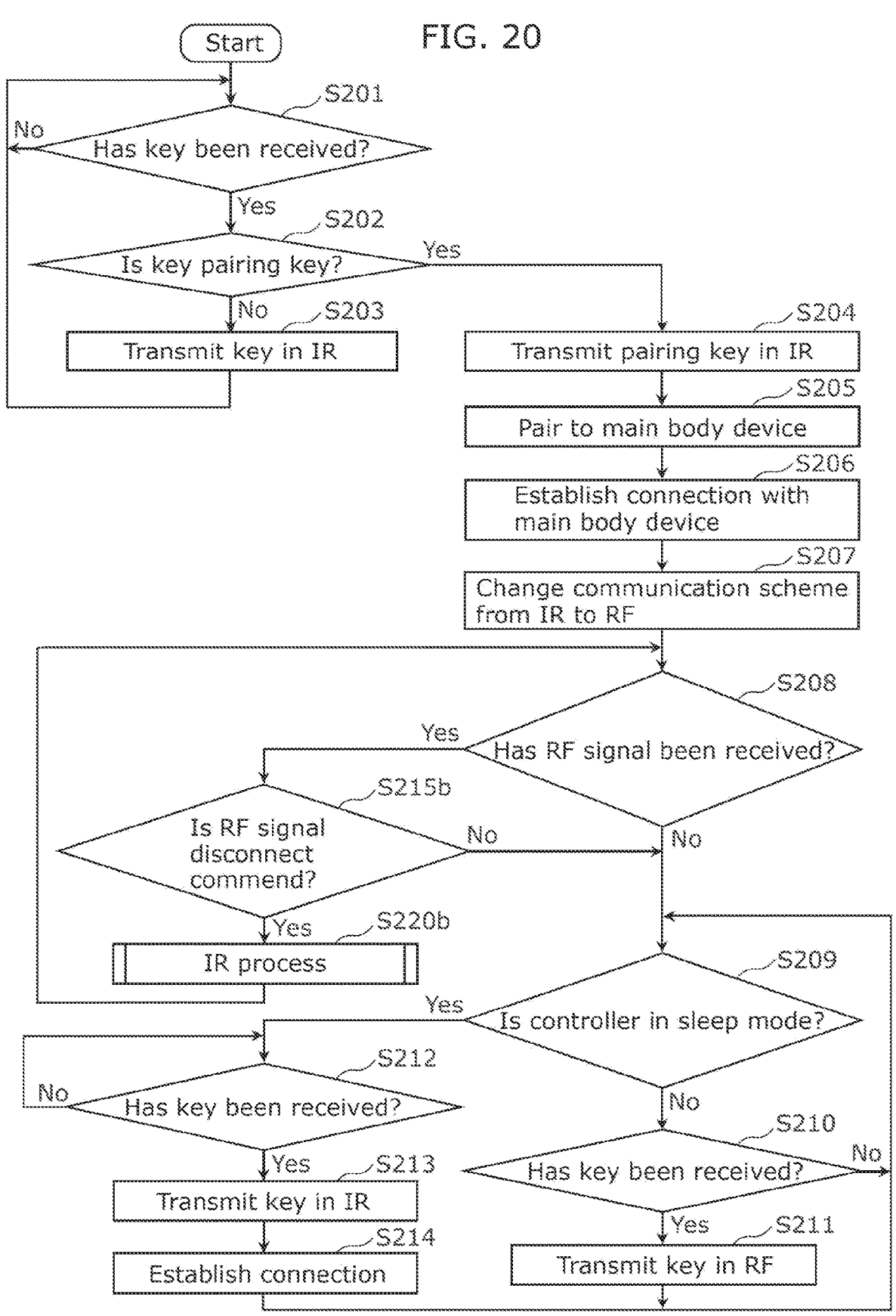
FIG. 20 is a flowchart illustrating processing procedures of the operation device according to Embodiment 3.

FIG. 20 is a flowchart illustrating processing procedures of operation device 200b according to Embodiment 3.

In the flowchart illustrated in FIG. 20, initially, main body device 100b and operation device 200b are in a state in which they have not established a connection for wireless communication in which an RF signal is used.

First, controller 240b determines whether operator 210 has received an instruction from the user. In other words, controller 240b determines whether operator 210 has received an input of a key (step S201).

If operator 210 has not received any input of a key (No at step S201), controller 240b repeats the process of step S201.

Meanwhile, if operator 210 has received an input of a key (Yes at step S201), controller 240b determines whether the received key is a pairing key instructing controller 240b to execute a pairing process of pairing to main body device 100b (step S202).

If controller 240b determines that the received key is not a pairing key (No at step S202), controller 240b transmits an IR signal indicating this key via IR communicator 220 (step S203) and returns the process to step S201.

Meanwhile, if controller 240b determines that the received key is a pairing key (Yes at step S202), controller 240b transmits an IR signal indicating the pairing key via IR communicator 220 (step S204).

Next, controller 240b executes pairing to main body device 100b (step S205).

Next, controller 240b establishes a connection for communication with main body device 100b and thus enters a state of being in communication with main body device 100b (step S206). If the state has been switched from the disconnected state to the communicating state, controller 240b transmits, to main body device 100b, an ACK responding to a POLL signal transmitted from main body device 100b at regular intervals.

Next, controller 240b switches the signal that controller 240b uses to transmit, to main body device 100b, a signal that includes a key in response to operator 210 receiving an input of a key from an IR signal to an RF signal (step S207).

Next, controller 240b determines whether controller 240b has received an RF signal (an RF packet) via RF communicator 230 (step S208).

If controller 240b has received an RF signal (Yes at step S208), controller 240b determines whether the received RF signal is an RF signal indicating a disconnect command (step S215b).

If controller 240b determines that the received RF signal is an RF signal that includes a disconnect command (Yes at step S215b), controller 240b executes the IR process (step S220b). The IR process will be described later.

If controller 240b has not received any RF signal (No at step S208) or if the received RF signal is not an RF signal that includes a disconnect command (No at step S215b), controller 240b determines whether controller 240b is currently in a sleep mode or controller 240b is to enter a sleep mode later on (step S209).

If controller 240b is neither currently in a sleep mode nor to enter a sleep mode later on (No at step S209), and if controller 240b has received an input of a key (Yes at step S210), controller 240b transmits an RF signal indicating the received key to main body device 100b via RF communicator 230 (step S211).

Meanwhile, if controller 240b is neither currently in a sleep mode nor to enter a sleep mode later on (No at step S209), and if controller 240b has not received any input of a key (No at step S210), controller 240b returns the process to step S209.

Meanwhile, if controller 240b is currently in a sleep mode or is to enter a sleep mode later on (Yes at step S209), controller 240b determines whether operator 210 has received an input of a key (step S212).

If operator 210 has not received any input of a key (No at step S212), controller 240b remains in a sleep mode (or enters a sleep mode) and continues with the determination at step S212.

Meanwhile, if operator 210 has received an input of a key (Yes at step S212), controller 240b resumes from the sleep mode to return to a normal mode and transmits an IR signal indicating the received key (step S213).

Next, controller 240b transmits an RF signal that includes a connection command via RF communicator 230 to reestablish a connection for communication with main body device 100b, and thus controller 240b enters, from the disconnected state, the communicating state of being in communication with main body device 100b (step S214). If the state has been switched from the disconnected state to the communicating state, controller 240b transmits, to main body device 100b, an ACK responding to a POLL signal transmitted from main body device 100b at regular intervals.

Figure 21:
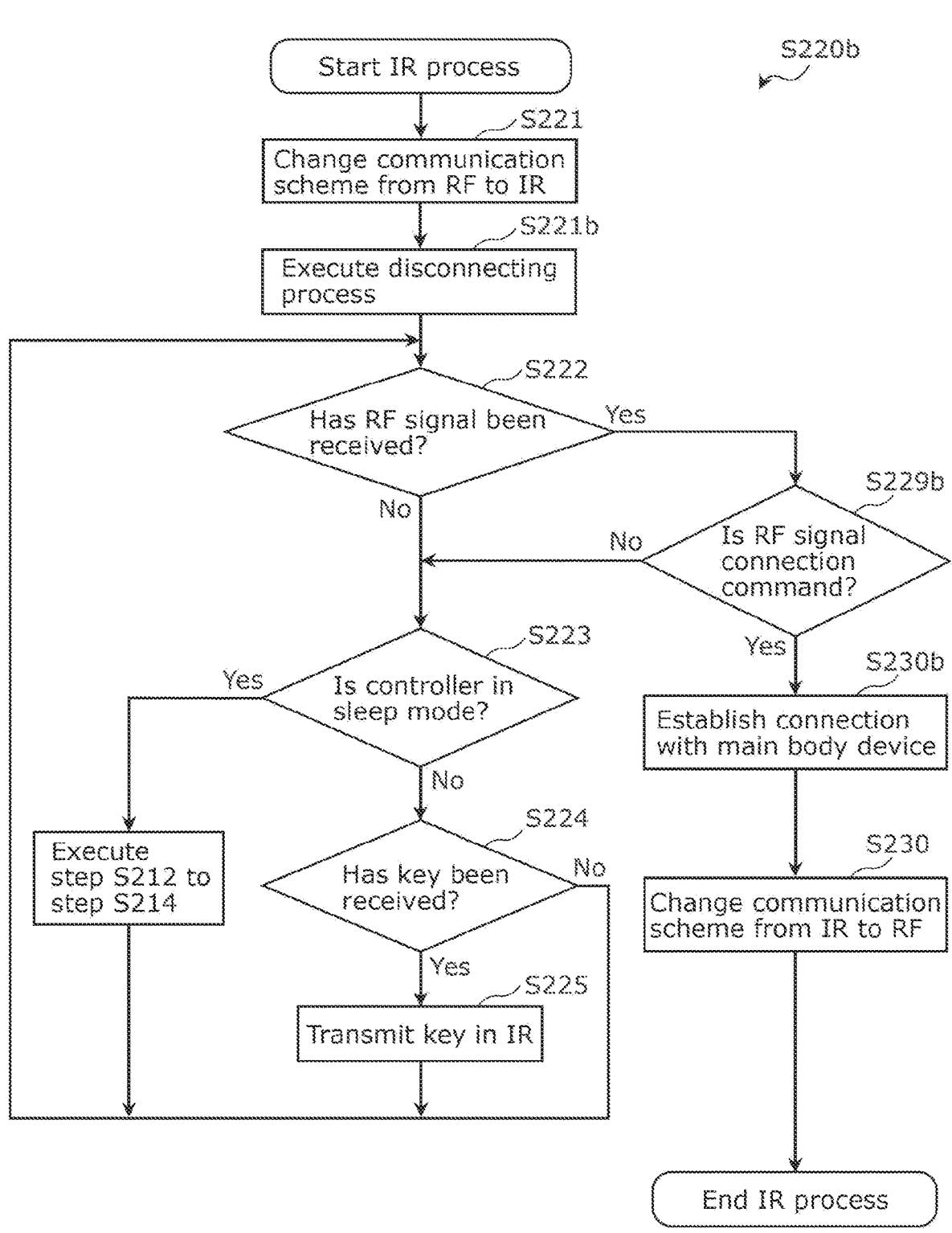
FIG. 21 is a flowchart illustrating an IR process that the operation device according to Embodiment 3 executes.

FIG. 21 is a flowchart illustrating the IR process that operation device 200b according to Embodiment 3 executes. Specifically, FIG. 21 is a flowchart illustrating the details of step S220b of FIG. 20.

If controller 240b has received an RF signal indicating a disconnect command via RF communicator 230 (Yes at step S215 of FIG. 20), controller 240b switches the signal that controller 240b transmits from an RF signal to an IR signal and enters the disconnected state from the communicating state (step S221).

Next, controller 240b executes a disconnecting process of disconnecting communication with main body device 100b (step S221b). Specifically, controller 240b stops transmitting an ACK to main body device 100b.

Next, controller 240b determines whether controller 240b has received an RF signal (an RF packet) via RF communicator 230 (step S222).

If controller 240b has received an RF signal (Yes at step S222), controller 240b determines whether information that the received RF signal includes is a connection command (step S229b).

If controller 240b determines that the received RF includes a connection command (Yes at step S229b), controller 240b establishes communication with main body device 100b (step S230b). Specifically, controller 240b transmits an ACK to main body device 100b in response to a POLL signal transmitted repeatedly from main body device 100b. With this operation, main body device 100b and operation device 200b enter the communicating state.

Next, controller 240*b* switches the signal that controller 240*b* transmits from an IR signal to an RF signal (step S230).

Meanwhile, if controller 240*b* fails to receive an RF signal within a predetermined time (No at step S222) or if the received RF signal does not include a connection command (No at step S229), controller 240*b* determines whether controller 240*b* is currently in a sleep mode or is to enter a sleep mode later on (step S223).

If controller 240*b* is currently in a sleep mode or is to enter a sleep mode later on (Yes at step S223), controller 240*b* executes the processes at step S212 to step S214 of FIG. 20 and returns the process to step S222.

Meanwhile, if controller 240*b* is neither currently in a sleep mode nor to enter a sleep mode later on (No at step S223), controller 240*b* determines whether operator 210 has received an input of a key (step S224).

If operator 210 has received an input of a key (Yes at step S224), controller 240*b* transmits an IR signal indicating the received key (step S225).

Meanwhile, if operator 210 has not received any input of a key (No at step S224), controller 240*b* returns the process to step S222.

<Switching Process>

Figure 22:
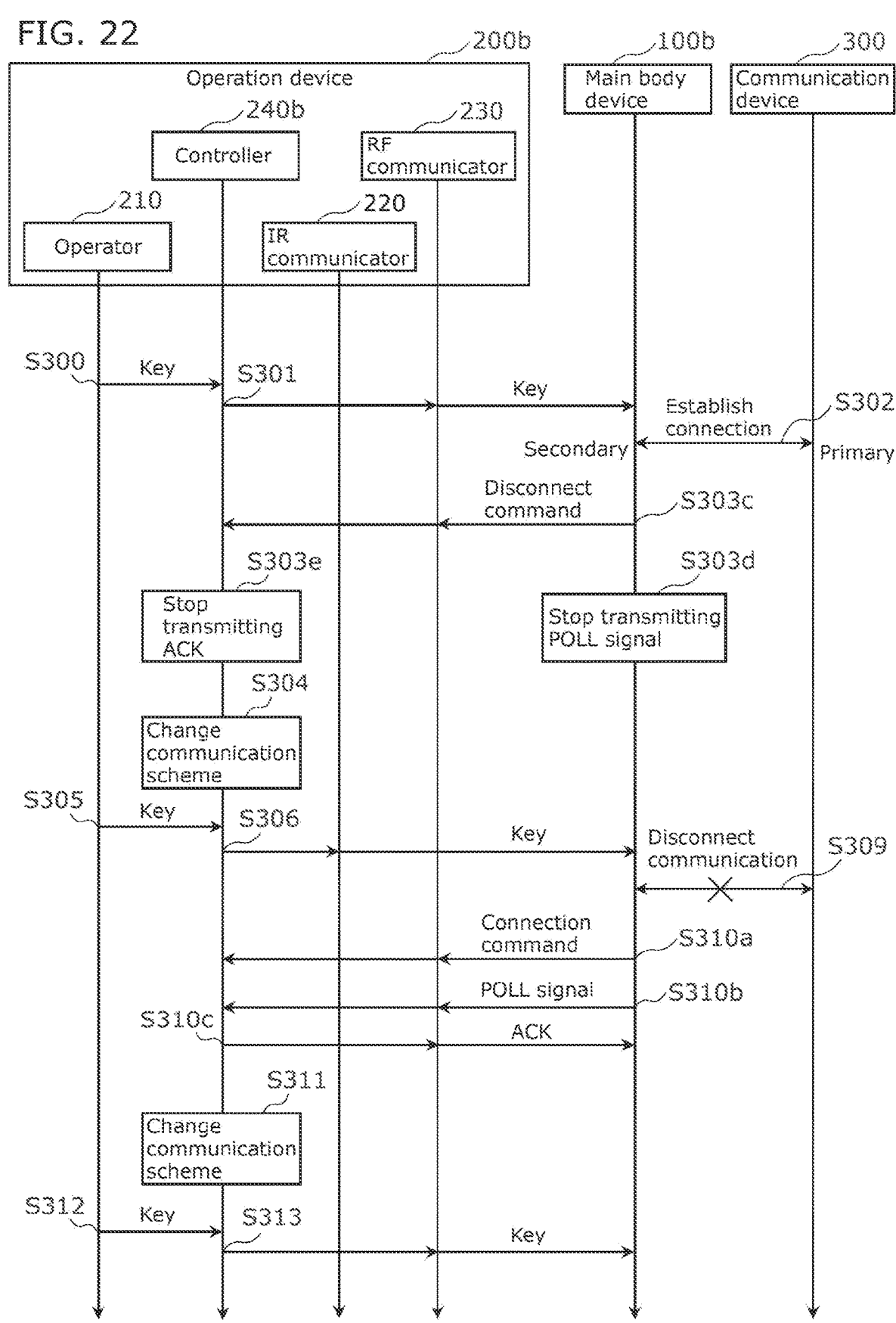
FIG. 22 is a sequence diagram illustrating processing procedures of a switching process performed in a communication system according to Embodiment 3.

FIG. 22 is a sequence diagram illustrating processing procedures of the switching process performed in the communication system according to Embodiment 3.

In the sequence diagram illustrated in FIG. 22, initially, communication is established between main body device 100*b* and operation device 200*b*, but no communication is established between main body device 100*b* and communication device 300.

For example, operator 210 receives an input (a key input) from the user (step S300).

Next, controller 240*b* transmits an RF signal that includes the key received by operator 210 to main body device 100*b* via RF communicator 230 (step S301). Main body device 100*b* executes a process in accordance with the key included in the received RF signal.

At this point, main body device 100*b* establishes a connection for communication such that, for example, main body device 100*b* is a slave and communication device 300 is a master (step S302).

In this case, after step S302, as the switching process described above, main body device 100*b* transmits, to operation device 200*b*, an RF signal that includes a disconnect command that causes operation device 200*b* to transmit a signal in an IR signal (step S303*c*).

Moreover, main body device 100*b* stops transmitting a POLL signal to operation device 200*b* (S303*d*).

In response to receiving a disconnect command from main body device 100*b* via RF communicator 230 (step S303*e*), controller 240*b* stops transmitting an ACK to main body device 100*b*. With this operation, main body device 100*b* and operation device 200*b* enter the disconnected state from the communicating state.

Meanwhile, controller 240*b* changes the communication scheme such that, when operation device 200*b* transmits a signal that includes a key to main body device 100*b*, operation device 200*b* transmits the signal in an IR signal (step S304).

With this operation, in response to operator 210 receiving an input (a key input) from the user (step S305), controller 240*b* transmits an IR signal that includes the key that operator 210 has received to main body device 100*b* via IR communicator 220 (step S306).

In this example, the communication between main body device 100*b* and communication device 300 becomes disconnected after step S303*c* (step S309).

In this case, as the switching process described above, main body device 100*b* transmits, to operation device 200*b*, an RF signal that includes a connection command that causes operation device 200*b* to transmit a signal in an RF signal (step S310*a*).

Moreover, as the switching process described above, main body device 100*b* also starts transmitting a POLL signal to operation device 200*b* again (S310*b*).

In response to receiving a POLL signal and a connection command from main body device 100*b* via RF communicator 230, controller 240*b* transmits an ACK to main body device 100*b* (step S310*c*). With this operation, main body device 100*b* and operation device 200*b* enter the communicating state from the disconnected state.

In addition, controller 240*b* changes the communication scheme such that, when operation device 200*b* transmits a signal that includes a key to main body device 100*b*, operation device 200*a* transmits the signal in an RF signal (step S311).

With this operation, in response to operator 210 receiving an input (a key input) from the user after step S311 (step S312), controller 240*b* transmits an RF signal that includes the key that operator 210 has received to main body device 100*b* via RF communicator 230 (step S313).

[3-3. Advantageous Effects and Others]

As described above, according to Embodiment 3, controller 140*b* of main body device 100*b* repeatedly transmits a POLL signal for synchronizing with operation device 200*b* to operation device 200*b*. Moreover, for example, in the switching process described above, controller 140*b* transmits a switch signal (a disconnect command, according to the present embodiment) and stops transmitting a POLL signal.

In addition, according to Embodiment 3, controller 240*b* of operation device 200*b* repeatedly receives, from main body device 100*b*, a POLL signal for synchronizing with main body device 100*b* and repeatedly transmits, to main body device 100*b*, an ACK responding to the received POLL signal. In addition, for example, in response to receiving a switch signal, controller 240*b* stops transmitting an ACK.

According to this configuration, main body device 100*b* and operation device 200*b* transmit or receive neither a POLL signal nor an ACK, and thus an occurrence of a data collision in main body device 100*b* can be further suppressed.

Other Embodiments

Thus far, Embodiment 1, Embodiment 2, and Embodiment 3 have been described to illustrate the techniques disclosed in the present application. The techniques according to the present disclosure, however, are not limited to these embodiments and can also be applied to an embodiment that includes, for example, modifications, substitutions, additions, or omissions, as appropriate. In addition, a new embodiment can be conceived of by combining the constituent elements described in the foregoing embodiments.

Accordingly, some other embodiments are illustrated below.

For example, according to the foregoing embodiments, the whole or a part of the constituent elements of the processors, such as the controllers, included in the main body device or the operation device according to the present disclosure may be constituted by dedicated pieces of hardware or implemented through execution of software programs suitable for the respective constituent elements. The constituent elements may each be implemented as a program executer, such as a central processing unit (CPU) or a processor, reads out a software program recorded in a recording medium, such as a hard disk drive (HDD) or a semiconductor memory, and executes the software program.

Moreover, the constituent elements of the processor, such as the controllers, of the main body device or the operation device according to the present disclosure may be constituted by one or more electronic circuits. The one or more electronic circuits may each be a general purpose circuit or a dedicated circuit.

The one or more electronic circuits may include, for example but not limited to, a semiconductor device, an integrated circuit (IC), or a large scale integration (LSI) circuit. An IC or an LSI circuit may be integrated into a single chip or into a plurality of chips. Although the term used herein is an IC or an LSI circuit, a circuit may also be called a system LSI circuit, a very large scale integration (VLSI) circuit, or an ultra large scale integration (ULSI) circuit, depending on the degree of integration. Moreover, a field programmable gate array (FPGA) that can be programmed after manufacturing an LSI circuit can also be used for the same purposes.

General or specific aspects of the present disclosure may be implemented in the form of a system, a device, a method, an integrated circuit, or a computer program. Alternatively, the general and specific aspects may be implemented in the form of a computer readable non-transitory recording medium, such as an optical disc, an HDD, or a semiconductor memory, having recorded thereon the computer program.

For example, the present disclosure may be implemented in the form of a method of controlling a main body device that communicates wirelessly with an operation device and a communication device. The operation device may be capable of transmitting or receiving a signal in a first communication scheme and capable of transmitting a signal in a second communication scheme different from the first communication scheme. The communication device may be capable of transmitting or receiving a signal in the first communication scheme. The main body device may include a first communicator for transmitting or receiving a signal in the first communication scheme, and a second communicator for receiving a signal in the second communication scheme. The method of controlling the main body device may include: determining whether it is possible to determine a timing of transmitting or receiving a signal to or from the communication device via the first communicator, by communicating with the communication device via the first communicator; in response to determining that it is not possible to determining the timing, executing a switching process that causes the operation device to transmit an operation signal in the second communication scheme; and executing a process in accordance with the operation signal received via the second communicator.

In addition, the present disclosure may be implemented in the form of a program that causes a computer to execute a method of controlling a main body device according to Embodiment 1 described above, Embodiment 2 described above, or Embodiment 3 described above. This program may be recorded on a non-transitory computer readable recording medium, such as a CD-ROM, or may be distributed over the internet or the like via a communication line.

Moreover, the present disclosure may be implemented in the form of a method of controlling an operation device that is for operating a main body device by transmitting, to the main body device, an operation signal in a first communication scheme or a second communication scheme. The operation device may include a first communicator for transmitting or receiving a signal in the first communication scheme, and a second communicator for receiving a signal in the second communication scheme. The method of controlling the operation device may include: transmitting an operation signal in the second communication scheme, in response to determining that the main body device has executed a switching process that causes the operation device to transmit an operation signal in the second communication scheme; and transmitting an operation signal in the first communication scheme, in response to determining that the main body device has not executed the switching process.

In addition, the present disclosure may be implemented in the form of a program that causes a computer to execute a method of controlling an operation device according to Embodiment 1 described above, Embodiment 2 described above, or Embodiment 3 described above. This program may be recorded on a non-transitory computer readable recording medium, such as a CD-ROM, or may be distributed over the internet or the like via a communication line.

Thus far, some embodiments have been described to illustrate the techniques according to the present disclosure. The appended drawings and the detailed description are provided for that purpose.

Therefore, the constituent elements illustrated in the appended drawings and described in the detailed description may include not only a constituent element that is essential for solving the problem but also a constituent element that is merely for illustrating the techniques and is not essential for solving the problem. Hence, that these components that are not essential are illustrated in the appended drawings and described in the detailed description should not immediately give any authorization that these non-essential components are considered to be essential.

Since the foregoing embodiments are merely for illustrating the techniques according to the present disclosure, various modifications, substitutions, additions, omissions, and so on can be made within the scope of the claims and equivalents thereof.

INDUSTRIAL APPLICABILITY

The present disclosure can be applied to, for example but not limited to, a television set capable of communicating wirelessly with a plurality of devices.

The invention claimed is:

1. A main body device that communicates wirelessly with an operation device and a communication device, the operation device being capable of transmitting and receiving a signal in a first communication scheme and capable of transmitting a signal in a second communication scheme different from the first communication scheme, the communication device being capable of transmitting and receiving a signal in the first communication scheme, the main body device comprising:
   a first communicator for transmitting and receiving a signal in the first communication scheme;
   a second communicator for receiving a signal in the second communication scheme; and a controller that executes a process in accordance with an operation signal transmitted from the operation device and received via the first communicator or the second communicator, wherein the controller:

determines, by communicating with the communication device via the first communicator, whether the controller can determine a timing of transmitting or receiving a signal to or from the communication device via the first communicator;

in response to determining that the controller cannot determine the timing, executes a switching process that causes the operation device to transmit the operation signal in the second communication scheme;

repeatedly transmits a polling signal for synchronizing with the operation device to the operation device via the first communicator; and in the switching process, causes the operation device to transmit the operation signal in the second communication scheme, by stopping transmitting the polling signal.

2. The main body device according to claim 1, wherein in the switching process, the controller causes the operation device to transmit the operation signal in the second communication scheme, by transmitting, to the operation device via the first communicator, a switch signal that causes the operation device to transmit the operation signal in the second communication scheme.

3. The main body device according to claim 2, wherein the controller:

repeatedly transmits, to the operation device, a polling signal for synchronizing with the operation device; and in the switching process, transmits the switch signal and stops transmitting the polling signal.

4. A method of controlling a main body device that communicates wirelessly with an operation device and a communication device, the operation device being capable of transmitting and receiving a signal in a first communication scheme and capable of transmitting a signal in a second communication scheme different from the first communication scheme, the communication device being capable of transmitting and receiving a signal in the first communication scheme, the main body device including:

a first communicator for transmitting and receiving a signal in the first communication scheme; and a second communicator for receiving a signal in the second communication scheme, the method of controlling the main body device comprising:

determining, by communicating with the communication device via the first communicator, whether it is possible to determine a timing of transmitting or receiving a signal to or from the communication device via the first communicator;

in response to determining that it is not possible to determine the timing, executing a switching process that causes the operation device to transmit an operation signal in the second communication scheme;

executing a process in accordance with the operation signal received via the second communicator;

repeatedly transmitting a polling signal for synchronizing with the operation device to the operation device via the first communicator; and in the switching process, transmitting the operation signal in the second communication scheme, by stopping transmitting the polling signal.

5. A non-transitory computer readable recording medium having recorded thereon a program that causes a computer to execute the method of controlling the main body device according to claim 4.

in response to failing to receive the polling signal within a predetermined time, determines that the main body device has executed the switching process, and transmits the operation signal in the second communication scheme.

6. A main body device that communicates wirelessly with an operation device and a communication device, the operation device being capable of transmitting and receiving a signal in a first communication scheme and capable of transmitting a signal in a second communication scheme different from the first communication scheme, the communication device being capable of transmitting and receiving a signal in the first communication scheme, the main body device comprising:

a first communicator for transmitting and receiving a signal in the first communication scheme;

a second communicator for receiving a signal in the second communication scheme; and a controller that executes a process in accordance with an operation signal transmitted from the operation device and received via the first communicator or the second communicator, wherein the controller:

determines, by communicating with the communication device via the first communicator, whether the controller can determine a timing of transmitting or receiving a signal to or from the communication device via the first communicator in coordination with a timing of receiving the operation signal from the operation device via the first communicator; and in response to determining that the controller cannot determine the timing, executes a switching process that causes the operation device to transmit the operation signal in the second communication scheme.

* * * * *